US012779735B2

(12) United States Patent
Sonntag

(10) Patent No.: US 12,779,735 B2
(45) Date of Patent: Nov. 3, 2026

(54) DRILLING TOOL WITH DUST REMOVAL SLEEVE

(71) Applicant: Robert Bosch GmbH, Stuttgart (DE)

(72) Inventor: Stefan Sonntag, Vogt (DE)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 17/051,765

(22) PCT Filed: Apr. 25, 2019

(86) PCT No.: PCT/EP2019/060553
§ 371 (c)(1),
(2) Date: Jun. 11, 2021

(87) PCT Pub. No.: WO2019/214950
PCT Pub. Date: Nov. 14, 2019

(65) Prior Publication Data
US 2021/0331350 A1 Oct. 28, 2021

(30) Foreign Application Priority Data

May 7, 2018 (DE) ..................... 10 2018 207 064.4
Nov. 6, 2018 (DE) ..................... 10 2018 218 874.2
Apr. 18, 2019 (DE) ..................... 10 2019 205 656.3

(51) Int. Cl.
*B28D 7/02* (2006.01)
*B23Q 11/00* (2006.01)
(Continued)

(52) U.S. Cl.
CPC ............ *B28D 7/02* (2013.01); *B23Q 11/0046* (2013.01); *B25D 17/02* (2013.01); *B28D 1/146* (2013.01); *B23B 2251/68* (2013.01)

(58) Field of Classification Search
CPC ...... B23B 2251/68; B28D 1/146; B28D 7/02; B23Q 11/0046; B25D 17/02; E21B 10/445; Y10T 408/44
See application file for complete search history.

(56) References Cited

U.S. PATENT DOCUMENTS 994,430 A 6/1911 Tunks
3,422,913 A * 1/1969 Young, Jr. .............. E21B 17/22
175/323
(Continued)

FOREIGN PATENT DOCUMENTS

CN 1302711 A 7/2001
CN 202271449 U 6/2012
(Continued)

OTHER PUBLICATIONS

English Translation of DE102014106968A1 (Year: 2015).*
International Search Report corresponding to PCT Application No. PCT/EP2019/060553, mailed Jul. 16, 2019 (German and English language document) (7 pages).

*Primary Examiner* — Robert E Fuller
(74) *Attorney, Agent, or Firm* — Maginot, Moore & Beck LLP

(57) ABSTRACT

A drilling tool, in particular a rock drill, extends along a longitudinal axis and includes a drill head, an insertion end, a main body, a sleeve element, a conveying portion arranged between the drill head and the insertion end, and at least one conduit that extends along the conveying portion. The conduit is located radially between the sleeve element and the main body. The sleeve element is rotatably mounted on the main body.

21 Claims, 22 Drawing Sheets

(51) Int. Cl.

| | |
|---|---|
| ***B25D 17/02*** | (2006.01) |
| ***B28D 1/14*** | (2006.01) |

(56) References Cited

U.S. PATENT DOCUMENTS

| | | | | | |
|---|---|---|---|---|---|
| 3,442,161 | A * | 5/1969 | Moyse | B28D 1/146 408/155 |
| 4,113,037 | A | 9/1978 | Wanner et al. | |
| 4,726,301 | A * | 2/1988 | Des Ormeaux | E21B 41/005 219/390 |
| 5,033,917 | A | 7/1991 | McGlasson et al. | |
| 2012/0063856 | A1 * | 3/2012 | Miwa | B23Q 11/0046 408/67 |

FOREIGN PATENT DOCUMENTS

| | | | | |
|---|---|---|---|---|
| CN | 203830776 | U | 9/2014 | |
| CN | 207077631 | U | 3/2018 | |
| DE | 32 37 721 | A1 | 4/1984 | |
| DE | 3340090 | A1 * | 5/1985 | B23Q 11/0046 |
| DE | 196 19 023 | A1 | 11/1997 | |
| DE | 102014106968 | A1 * | 11/2015 | B23B 47/34 |
| DE | 20 2016 008 430 | U1 | 1/2018 | |
| EP | 0 697 495 | A2 | 2/1996 | |
| JP | 2001-191268 | A | 7/2001 | |

* cited by examiner

DRILLING TOOL WITH DUST REMOVAL SLEEVE

This application is a 35 U.S.C. § 371 National Stage Application of PCT/EP2019/060553, filed on Apr. 25, 2019, which claims the benefit of priority to Serial No. DE 10 2018 207 064.4, filed on May 7, 2018 in Germany, and which claims the benefit of priority to Serial No. DE 10 2018 218 874.2, filed on Nov. 6, 2018 in Germany, and which claims the benefit of priority to Serial No. DE 10 2019 205 656.3, filed on Apr. 18, 2019 in Germany, the disclosures of which are incorporated herein by reference in their entirety.

BACKGROUND

DE 3237721 A1 describes a rock drill-bit for extracting drilling cuttings by suction, the rock drill-bit having a drill-bit shank that has a longitudinal central bore. In order to create channels for the intake air and outlet air, the drill-bit shank has a sheath such that a clearance, or cavity, through which the drilling dust can be extracted by suction, is created between the drill-bit shank and the sheath.

SUMMARY

The disclosure relates to a drilling tool, in particular a rock drill-bit, which extends along a longitudinal axis, comprising a drilling head, an insertion end, a main body, a sleeve element, a conveying region arranged radially between the drilling head and the insertion end, and at least one conveying channel that extends along the conveying region, wherein the conveying channel is arranged radially between the sleeve element and the main body. It is proposed that the sleeve element be rotatably mounted on the main body. It is thereby possible, advantageously, to realize a drilling tool that is inexpensive to produce and easy to clean.

The drilling tool is realized, in particular, as a rock drill-bit that is designed for a hammer drill. At its end that faces away from the drilling head, the drilling tool has an insertion end, which is designed for coupling to a hand-held power tool such as, for example, a hammer drill. Preferably, in the region of the insertion end the drilling tool is realized in such a manner that the drilling tool can be coupled to a tool receiver of the hand-held power tool. For example, in the region of the insertion end the drilling tool may have form-fit elements, realized as special slots, which form an SDS-plus interface or an SDS-max interface. For the purpose of performing work on a workpiece, the drilling tool is put into a rotating, as well as linearly oscillating, or percussive, state by means of the hammer drill. As work is being performed, the drilling tool penetrates the workpiece in the direction of advance of the drilling tool. The direction of advance of the drilling tool is coaxial with the longitudinal axis, and in the direction of the drilling head, starting from the insertion end. The longitudinal axis of the drilling tool corresponds, in particular, to a work axis or rotation axis of the drilling tool. A drilling head in this context is to be understood to mean, in particular, a region of the drilling tool that has at least one cutting body. The cutting body has at least one cutting element, which may be realized as a main cutting element or as a secondary cutting element. The cutting elements are made, in particular, from a hard metal. Preferably, the cutting elements have a greater hardness than the main body. Each cutting element has at least one cutting edge. The cutting edge corresponds to the line of intersection of a rake face and a flank of the cutting element. Preferably, each cutting element has a single cutting edge. Alternatively, the cutting element may also have a plurality of cutting edges, which in particular merge into each other. In particular, the region of the cutting head is spanned by the at least one cutting body. The conveying channel is designed, in particular, to convey a fluid, preferably an air flow, within the drilling tool. The conveying channel is preferably designed to extract drilling cuttings by suction within a drilled hole during a drilling operation. The drilling cuttings are preferably conveyed contrary to the direction of advance of the drilling tool. The conveying channel has a suction intake opening and a suction outlet opening, the distance between which corresponds to the length of the conveying channel. The conveying channel may be realized eccentrically or concentrically. An eccentric, or concentric, conveying channel is to be understood to mean, in particular, a conveying channel that extends, by at least 70% of its length, preferably by at least 90% of its length, more preferably substantially along its entire length, eccentrically, or concentrically, in relation to the longitudinal axis of the drilling tool.

The drilling cuttings can enter the conveying channel via the suction intake opening. Preferably, the drilling head comprises at least one suction intake opening. The suction intake opening and the suction outlet opening may be substantially parallel to each other, preferably substantially perpendicular to each other. Preferably, the cutting body has at least two cutting elements, more preferably at least four cutting elements. The connection of the cutting body to the drilling tool is effected, in particular, by means of a materially bonded connection. Preferably, the drilling head is realized as a solid carbide head, a single cutting body having at least one cutting element being connected to the main body via a blunt face, preferably by means of a welded joint. Alternatively, it is also conceivable for the drilling tool to have notches, into which the at least one cutting body is inserted and connected, in particular, by means of a soldered joint. In this context, the welded joint differs from the soldered joint, in particular, in that, in the case of the welded joint, there is partial melting of the components to be connected. In particular, the joining region has at least one securing element, which is designed to connect the drilling tool to a suction extraction adapter. Preferably, in the connected state the suction extraction adapter is partially movable in relation to the drilling tool, in particular partially movable in relation to the main body of the drilling tool. In particular, the suction extraction adapter is connected in an axially immovable and rotatable manner, such that the suction extraction adapter is substantially fixed axially on the drilling tool, and the drilling tool can rotate within the suction extraction adapter. In particular, the suction extraction adapter is fixed with play on the drilling tool. The suction outlet opening is arranged, in particular, in the joining region. Preferably, the conveying channel is arranged partially in the joining region. The main body is preferably connected in a materially bonded manner to the drilling head, in particular to the cutting body. Preferably, the main body intersects the longitudinal axis of the drilling tool. In particular, the main body is at least partially, preferably completely, axially contiguous with the drilling head, or the cutting body. The main body is designed, in particular, to transmit a percussive impulse from the hand-held power tool to the drilling head. The main body is composed of a metallic material, in particular a steel. In particular, the main body is coupled in a rotationally fixed manner to the insertion end. The main body may be realized so as to form a single piece with the insertion end. The sleeve element is realized, in particular, as a tubular, elongate cover arranged around the main body. The sleeve element may be contiguous with the main body, but it is also conceivable that there is a gap realized radially between the sleeve element and the main body. It is proposed that, in the assembled state, the gap is arranged between the sleeve element and the main body, the gap being realized in such a manner that dust particles or drilling cuttings can be moved between at least two conveying channels. The dust particles have a size of between 10 μm and 1000 μm. The drilling cuttings have a size of from at least 1 mm to several mm, such as, for example, 5 mm. The gap preferably has a size of between 0.05 mm and 0.5 mm, in particular a size of substantially 0.3 mm. The gap in this case extends along at least 10% of the length of the sleeve element, preferably along at least 25% of the length of the sleeve element, more preferably at least 50% of the length of the sleeve element. In the case of drilling tools having a nominal diameter of up to 20 mm, the gap is preferably in a range of between 0.05 mm and 1.5 mm. In the case of drilling tools having a nominal diameter of over 20 mm, the gap is advantageously in a range of between 0.05 mm and 3 mm. The nominal diameter in this context is to be understood to mean, in particular, the maximum drill-head diameter, which substantially determines the diameter of the drilled hole. In particular, the main body and the sleeve element are substantially parallel to each other in the conveying region. The sleeve element may be closed or partially open. A closed sleeve element in this case is to be understood to mean a sleeve element that completely encloses the main body, at least in the conveying region. A partially open sleeve element is to be understood to mean a sleeve element that encompasses the main body, in the conveying region, by at least 180° in the circumferential direction. A peripheral surface of the sleeve element may be even, being at a uniform radial distance from the longitudinal axis, or uneven, being at a non-uniform, in particular periodically varying, radial distance from the longitudinal axis. The sleeve element may be composed of a metallic material or of a material containing plastic. If the sleeve element is made of a metallic material, the sleeve element may be composed, in particular, of high-grade steel, preferably of C5CRNi18-10. This makes it possible, advantageously, to render the sleeve element highly resistant to abrasion and corrosion. If the sleeve element is made of a plastic material, the sleeve element may be composed of a thermoplastic or thermosetting plastic, e.g. polyethylene, polypropylene, polyurethane, polyethylene terephthalate, polyamide, acrylonitrile butadiene styrene, polyether ether ketone, polytetrafluoroethylene, etc. Sleeve elements made of plastic advantageously have a particularly high resistance to corrosion, especially against salts. In particular, the sleeve element and/or the suction extraction adapter is made of an elastic plastic. In this context, an elastic plastic is to be understood to mean, in particular, that the plastic has an elongation at break/elongation at tear, according to EN ISO 527-1, of from 30% to 180%, and/or a flexural modulus of elasticity, according to DIN EN ISO 178, of from 900 to 10000 MPA, and/or a temperature resistance of more than 90°. Advantageously, owing to the elastic design of the sleeve element, higher tolerances can be allowed with respect to the main body, enabling cost-optimized production. Preferably, the sleeve element is designed to be elastic in such a manner that the sleeve element can deform in the event of larger particles occurring between the main body and the sleeve element.

Preferably the sleeve element has a fiber reinforcement, which in particular is designed to increase the strength of the sleeve element. The fiber reinforcement is composed of fiber elements that can be aligned, for example by a winding technique known to the persons skilled in the art, or not aligned, for example in a manufacturing process using pultrusion, drawing or extrusion. The fiber elements may be realized, for example, as plastic fibers. In particular, the fiber elements are realized as aramid fibers, which advantageously have high resistance to abrasion. Alternatively or additionally, it is also conceivable for the fiber elements to be realized as glass fibers or carbon fibers.

The sleeve element may be of a conical shape. A conical shape in this context is to be understood to mean, in particular, a decreasing or increasing inner diameter of the sleeve element. The inner diameter in this case may increase, or decrease, continuously or non-continuously. In particular, the inner diameter decreases, or increases, from one end of the sleeve element to the other end of the sleeve element by at least 1%, preferably at least 5%, more preferably by at least 10%. The conical shape of the sleeve element makes it possible to realize conveying channels that have a cross-section that varies along the conveying channel.

In particular, the inner diameter of the sleeve element increases toward the drilling head. Production of the sleeve element, in particular a sleeve element realized so as to form a single piece with the suction extraction adapter, can thereby be simplified.

Preferably, the inner diameter of the sleeve element decreases toward the drilling head in such a manner that the cross-sectional area of the conveying channel increases in the direction of fluid flow. This measure can effectively counteract blockages in the conveying channel, since during operation blockages can be released by the vibrations.

The sleeve element may have a single layer, composed of a metal or plastic, or a plurality of layers, composed of a metal and/or plastic. In particular, the sleeve element has at least one inner layer and one outer layer, made of different materials. The inner layer, which faces toward and directly surrounds the main body of the drilling tool, preferably has a greater resistance to abrasion than the outer layer. The outer layer, which faces away from the main body of the drilling tool, preferably has a greater resistance to environmental influences such as moisture or UV radiation. It is conceivable, for example, for the inner layer to comprise aramid fibers and the outer layer to be made of glass-fiber reinforced or carbon-fiber reinforced plastic. It is also conceivable for there to be at least one intermediate layer arranged between the inner and the outer layer. The intermediate layer may be realized in such a manner, for example, that it substantially determines the shape of the sleeve element and/or acts as a force-absorbing layer.

The sleeve element has, in particular, a wall thickness that is in a range of between 0.4 mm and 1.0 mm, preferably between 0.4 mm and 1.0 mm, for a drill-head diameter of up to 20 mm. In the case of a drill-head diameter of greater than 20 mm, in particular greater than 25 mm, the sleeve element has a wall thickness in a range of between 0.4 and 4.0 mm, preferably between 0.4 and 2.0 mm. Preferably, a ratio of the wall thickness of the sleeve element to the diameter of the drilling head is in a range of between 5:100 and 1:2, more preferably in a range of between 1:10 and 1:2 for smaller drilling heads, and in a range of between 5:100 and 1:10 for larger drilling heads.

Preferably, the outer diameter of the sleeve element is smaller than a maximum diameter of the drilling head, such that a cavity, via which air can be drawn in, is formed on the outside of the sleeve element during drilling. In particular, the distance between the maximum diameter of the drilling head and the outer diameter of the sleeve element is between 0.05 mm and 2 mm, preferably between 0.1 mm and 1 mm, in the case of drilling tools having a nominal diameter of up to 20 mm, and is between 0.05 mm and 4.0 mm, preferably between 0.1 mm and 2.0 mm, in the case of drilling tools having a nominal diameter of greater than 20 mm, in particular greater than 25 mm.

Preferably, the main body and the sleeve element are composed of the same material. A conveying channel arranged radially between the main body and the sleeve element is to be understood to mean, in particular, that a straight line that intersects the longitudinal axis perpendicularly intersects the main body, the conveying channel and the sleeve element in this sequence.

It is furthermore proposed that the conveying channel be formed by a groove in the main body and/or in the sleeve element. A conveying channel can thus advantageously be realized by means of simple structural design. The groove may be arranged on the outer side of the main body or on the inner side of the sleeve element. The groove may have a cross-sectional area that is substantially constant over the length of the groove. Alternatively, it is also conceivable for the cross-sectional area of the groove to vary over the length of the groove. In particular, the cross-sectional area of the groove preferably decreases continuously toward the drilling head. The variation in the cross-sectional area in this case may be at least 5% preferably at least 10%, more preferably at least 25%.

It is furthermore proposed that the sleeve element be connected in a rotationally fixed manner to the suction extraction adapter, wherein the suction extraction adapter is designed to connect the drilling tool to a suction extraction device. This advantageously enables the sleeve element to be detached from and connected to the drilling tool, or the main body, together with the suction extraction adapter. In particular, the sleeve element is immovably connected to the sleeve element.

It is additionally proposed that the sleeve element be connected in a form-fitting and/or force-fitting manner to the suction extraction adapter. Alternatively or additionally, it is proposed that the sleeve element be connected to the suction extraction adapter in a materially bonded manner, or that the sleeve element and the suction extraction adapter be realized so as to form a single piece. It is conceivable, for example, for the sleeve element and the suction extraction adapter to be produced in an injection molding process. The materially bonded connection may be effected, for example, by means of an adhesive connection, a soldered connection or a welded connection.

It is furthermore proposed that the sleeve element be mounted axially on the main body in at least one direction, in particular in two directions, via a securing element. Advantageously, the sleeve element can thereby be mounted securely on the main body. The sleeve element may be mounted directly or indirectly on the main body via the securing element. Preferably, the sleeve element is mounted indirectly on the main body via the suction extraction adapter. The drilling tool may have more than one securing element. It is conceivable, for example, for the drilling tool to have a first securing element that is assigned to the main body, and a second securing element that is assigned to the suction extraction adapter. The securing element may be realized, for example, as a stop element that limits or substantially prevents a capability of the sleeve element to move along a degree of freedom, in particular along a translational degree of freedom. The securing element may be realized, for example, as a form-fit element or as a force-fit element. The securing element may be realized so as to form a single part or single piece with the drilling tool, in particular with the main body of the drilling tool. So as to form a single part, in this case, is to be understood to mean, in particular, also components connected to each other in a materially bonded manner. So as to form a single piece is to be understood to mean, in particular, that all elements assigned to the component are composed of the same material, there is no force-fitting and/or form-fitting connection between the elements and, in particular, there is also no materially bonded connection. Alternatively, it is conceivable for the sleeve element to be realized as a separate component. Preferably, the securing element has a surface coating. The surface treatment may be realized in such a manner that the friction between the securing element and a component with which the securing element is in contact, at least partially, is reduced. Alternatively or additionally, it is likewise conceivable for the coating to be realized in such a manner that the hardness of the securing element is increased. For example, the coating may be composed of polytetrafluoroethylene (PTFE).

It is furthermore proposed that the securing element be realized as a securing ring, arranged on the side of the sleeve element that faces away from the drilling head. Advantageously, the sleeve element can thus be mounted axially in a structurally simple manner. The securing ring may be realized, for example, as a snap ring.

It is additionally proposed that the securing element be connected to the main body in a force-fitting and/or form-fitting manner. In particular, the securing element is realized so as to form a single part or a single piece with the suction extraction adapter.

It is furthermore proposed that, for the purpose of making and/or undoing the connection to the main body, the suction extraction adapter be deformable. This advantageously enables the suction extraction adapter to be mounted on the drilling tool in a particularly simple manner. Preferably, the suction extraction adapter is made from an elastic material, in particular an elastic plastic. It is also conceivable for the deformability to be selectively influenced in a connection region by the shape of the suction extraction adapter, for example by a recess in the material.

The disclosure furthermore relates to a drilling tool, in particular a rock drill-bit, which extends along a longitudinal axis, comprising a drilling head, an insertion end, a conveying region, and at least one conveying channel that extends along the conveying region. It is proposed that the drilling tool have a junction region, in which there is arranged a multipart suction extraction adapter for connecting the drilling tool to a suction extraction device. This advantageously enables a part of the suction extraction adapter to be specifically adapted to the drilling tool, in particular to the size of the drilling tool, and the other part of the suction extraction adapter can be of a universal design, such that it fits on all specific parts.

It is additionally proposed that the suction extraction adapter have at least one first housing and a second housing element, which are connected to each other via a housing interface. In particular, the housing interface is realized in such a manner that the housing elements to be connected can always be connected to each other with the same connection movement. Preferably, the housing interface is realized in such a manner that the housing elements connected to each other are always connected to each other in the same end position. Alternatively, it is also conceivable for the housing interface to be realized in such a manner that the housing elements can be connected to each other in differing end positions.

It is furthermore proposed that the first housing element be connected in a force-fitting and/or form-fitting manner to the drilling element, which rotates and/or oscillates linearly relative to the suction extraction adapter during operation. The drilling element may be realized, for example, as a main body of the drilling tool or as a sleeve element of the drilling tool.

It is furthermore proposed that the first housing element be inseparably fastened to the drilling element. An inseparable connection of the first housing element to the drilling element is to be understood to mean, in particular, that the connection is possible only by means of a tool, or preferably only by means of damage to or destruction of a component. In particular, the first housing element is inseparably connected to the sleeve element.

It is additionally proposed that the housing interface be designed for force-fitting and/or form-fitting connection. In particular, the first housing element and the second housing element have mutually corresponding connection elements. Mutually corresponding connection elements in this case are to be understood to mean at least two connection elements that are designed to effect a connection to each other. The connection elements may be realized, for example, as force-fit elements, as form-fit elements, as guide elements, as latching elements, etc.

It is furthermore proposed that the housing interface comprise at least one latching element and/or at least one hook-and-loop closure element. Advantageously, a flexible connection can thus be realized in a simple manner.

It is additionally proposed that the second housing element have a second housing interface, which is designed to connect the suction extraction adapter to a suction extraction device. The second housing interface is realized, in particular, as a suction-extraction device interface. Preferably, the first housing interface and the second housing interface are arranged on mutually opposites sides of the second housing element. The second housing interface preferably has force-fit elements and/or form-fit elements for separably coupling the suction extraction device.

The disclosure furthermore relates to a multipart suction extraction adapter for a drilling tool as previously described.

The disclosure furthermore relates to a drilling tool, in particular a rock drill-bit, which extends along a longitudinal axis, comprising a drilling head, an insertion end, a main body, a sleeve element, a conveying region arranged between the drilling head and the insertion end, at least one conveying channel that extends along the conveying region, wherein the conveying channel is arranged radially between the sleeve element and the main body. It is proposed that the drilling tool have a damping unit, which is designed to damp an impulse emanating from the main body. This advantageously enables the wear on the drilling tool to be reduced in an effective manner. The conveying channel in this case may be realized by a groove in the main body and/or in the sleeve element. An impulse emanating from the main body is to be understood in this case to mean, in particular, an impulse that is transmitted, in particular to the main body of the drilling tool, by a drive motion, that from the tool receiver of the hand-held power tool to the drilling tool, via the insertion end. The impulse to be damped in this case is, in particular, a percussive motion that is effected coaxially with the longitudinal extent of the drilling tool and that is used, for example, in a hammer-drilling mode or in a chiseling mode of a hammer drill or percussion hammer, respectively, for driving the drilling tool.

It is additionally proposed that the damping unit be designed to damp an impulse acting upon a suction extraction adapter. Additionally or alternatively, it is conceivable for the damping unit to be designed to damp an impulse acting upon the sleeve element. Advantageously, the wear between the main body and the suction extraction adapter, or the sleeve element, can thereby be reduced.

It is furthermore proposed that the damping unit have at least one first damping element, which bears against the main body and or against the sleeve element or against the suction extraction adapter. The first damping element is preferably realized as a B-impact damping element. A B-impact damping element is to be understood to mean, in particular, a damping element that damps an impulse emanating from the main body, contrary to the direction of advance. It is furthermore proposed that the damping unit have a second damping element, which in particular is arranged adjacent to the first damping element in the longitudinal direction. The first damping element is preferably realized as an A-impact damping element. An A-impact damping element is to be understood to mean, in particular, a damping element that damps an impulse emanating from the main body. contrary to the direction of advance of the drilling tool. Preferably, at least one of the damping elements, more preferably all damping elements, is/are arranged concentrically in relation to the longitudinal axis of the drilling tool.

It is additionally proposed that at least one of the damping elements be realized as a circular or oval rubber element. The damping element may be realized, for example, as an O-ring. Alternatively, it is also conceivable for the damping element to be realized as a Teflon sleeve or as a Teflon ring.

It is furthermore proposed that at least one of the damping elements be realized as a spring element. A spring element in this case is to be understood to mean, in particular, a component that is elastically deformable in such a manner that the impulse emanating from the main body is absorbed, at least partially, by means of the deformation. The spring element may be made of a metallic material or of a plastic. The spring element is realized, in particular, as an annular spring. The spring element may be, for example, substantially cylindrical or conical.

It is furthermore proposed that at least one of the damping elements be realized as a gas spring element. A gas spring element is to be understood to mean, in particular, a pneumatic spring in which a volume of gas in a defined space is under high pressure. A gas spring element makes it possible, advantageously, to effect a strong damping action with a small space requirement.

It is additionally proposed that at least one of the damping elements be realized as a single piece or single part with the suction extraction adapter. It is thereby possible, advantageously, to realize damping in an inexpensive manner.

The disclosure furthermore relates to a system, or a tool system, of a drilling tool and a suction extraction adapter, wherein the drilling tool extends a longitudinal axis, a drilling head, an insertion end, a conveying region arranged between the drilling head and the insertion end, and at least one conveying channel that extends along the conveying region, wherein an outer diameter of the conveying region differs from an outer diameter of the insertion end. It is proposed that the drilling tool have a junction region, in which the suction extraction adapter is arranged, wherein the junction region coincides with the conveying region and the insertion end. It is thereby possible, advantageously, to dispense with a separate coupling region, as known in the prior art, and the drilling tool can thus be produced inexpensively and with saving of material. To coincide in this context is to be understood to mean, in particular, that the junction region overlaps axially, and thus along the longitudinal axis of the drilling tool, with the conveying region and with the insertion end. An outer diameter of the conveying region in this case is to be understood to mean, in particular, an outer diameter in the conveying region that, between the suction intake opening and the suction outlet opening of the conveying channel, is constant at least along 50%, preferably at least along 70%, more preferably at least along 90% of the length of the conveying channel. Particularly preferably, the outer diameter of the outer diameter of the conveying region is to be understood to mean an outer diameter of the main body of the drilling tool in a region in which the main body has at least one groove forming a conveying channel. An outer diameter of the insertion end is to be understood to mean, in particular, an outer diameter corresponding to an outer diameter of the region of the drilling tool that, when having been connected to the hand-held power tool, is arranged in the tool receiver of the hand-held power tool. In particular, the outer diameter of the insertion end is a standardized outer diameter.

It is furthermore proposed that the suction extraction adapter have a first coupling region and a second coupling region, wherein the first coupling region coincides tithe the conveying region, and the second coupling region coincides with the insertion end. Preferably, the first coupling region and the second coupling region differ in design. In particular, the suction extraction adapter is connected to the drilling tool in the first coupling region and in the second coupling region. In particular, the connection of the suction extraction adapter to the drilling tool in the first coupling region is effected in a matter different to that in the second coupling region.

It is additionally proposed that the first coupling region have at least one connection element designed for connecting the suction extraction adapter to the drilling tool in a force-fitting and/or form-fitting manner. It is furthermore proposed that the second coupling region have at least one connection element designed for connecting the suction extraction adapter to the drilling tool in a force-fitting and/or form-fitting manner. In particular, at least one of the connection elements of the suction extraction adapter is designed to produce a form-fitting connection in the axial direction. Preferably, both connection elements of the suction extraction adapter are designed to produce a form-fitting connection in the radial direction.

It is furthermore proposed that, in the conveying region, the drilling tool have a connection element that corresponds to the connection element of the suction extraction adapter in the first coupling region. It is additionally proposed that the connection element of the drilling tool extend radially outward. The connection element is arranged, in particular, in the conveying region and/or in the junction region. The connection element has a coupling diameter that corresponds to its outer diameter. The coupling diameter is, in particular, greater than the outer diameter of the conveying region.

It is furthermore proposed that the conveying channel be arranged radially between a sleeve element and a main body of the drilling tool, and that the connection element of the drilling tool be realized as a collar of the sleeve element or as a disk element connected in a materially bonded manner. This advantageously enables a connection element to be realized in an inexpensive manner.

It is additionally proposed that the system comprise a second drilling tool, wherein an outer diameter of the insertion end of the second drilling tool corresponds to the outer diameter of the insertion end of the first drilling tool, and the outer diameter of the conveying region of the second drilling tool differs from the outer diameter of the conveying region of the first drilling tool, characterized in that suction extraction adapter is designed to be connectable to the first drilling tool and the second drilling tool. In particular, both the first drilling tool and the second drilling tool have a connection element, wherein the ratio between the coupling diameter of the first drilling tool and the outer diameter of the insertion end of the first drilling tool corresponds substantially to the ratio between the coupling diameter of the second drilling tool and the outer diameter of the insertion end of the second drilling tool. Thus, advantageously, the same suction extraction adapter can be connected to both drilling tools.

The disclosure furthermore relates to a drilling tool or to a suction extraction adapter as previously described.

The disclosure furthermore relates to an auxiliary spot-drilling suction extraction device for a drilling tool realized as a suction drill, which is designed to be connectable to the drilling tool in an axially movable manner. Advantageously, the auxiliary spot-drilling suction extraction device enables the take-up of drilling cuttings by the drilling tool to be improved. A suction drill is to be understood to mean, in particular, a drilling tool having a conveying channel. The drilling tool has a suction intake opening, which is preferably arranged in the drilling head, at the transition between the drilling head and the main body or adjacent to the drilling head. The auxiliary spot-drilling suction extraction device according to the disclosure is designed, in particular, to assist the spot-drilling operation in the case of suction drills, in which the at least one suction intake opening of the conveying channel is arranged at a distance from the front-end tip of the drilling head. The length of the drilling head corresponds to the distance between the tip of the drilling head and a joint face of the cutting body of the drilling head that extends transversely, or perpendicularly, in relation to the longitudinal axis of the drilling tool. A suction intake opening arranged at a distance from the tip of the drilling head is to be understood to mean, in particular, a distance between the tip of the drilling head and the suction intake opening that corresponds to at least 30%, preferably at least 60%, more preferably at least 90% of the length of the drilling head. The auxiliary spot-drilling suction extraction device is realized, in particular, as a single part, preferably as a single piece. In particular, the auxiliary spot-drilling suction extraction device has no connection to a suction extraction device of any kind.

In particular, the auxiliary spot-drilling suction extraction device can be connected in an axially movable manner to the drilling tool, in such a manner that the auxiliary spot-drilling suction extraction device, when in a connected state, is displaceable between a position in the conveying region and a position in the region of the drilling head. Preferably, the auxiliary spot-drilling suction extraction device is mounted in an axially movable manner on the drilling tool in such a manner that, during the drilling operation, the auxiliary spot-drilling suction extraction device changes its position relative to the drilling head and maintains its position relative to the workpiece.

Furthermore, by means of a fixing unit the auxiliary spot-drilling suction extraction device may be limited in its axial movement capability. The fixing unit may form, for example, a single part with the auxiliary spot-drilling suction extraction device. In this embodiment it would be conceivable, for example, for the auxiliary spot-drilling suction extraction device to have a force-fit element, by means of which the auxiliary spot-drilling suction extraction device is fixedly clamped on the sleeve element in such a manner that a movement of the auxiliary spot-drilling suction extraction device in the axial direction is prevented. The force-fit element may be realized, for example, as a screw, which is connected to the auxiliary spot-drilling suction extraction device and the sleeve element, in the fixed state, applies a force to the sleeve element. Alternatively it is conceivable for the fixing unit to be realized as a component separate from the auxiliary spot-drilling suction extraction device. Advantageously, the fixing unit has a force-fit and/or form-fit element for connection to the sleeve element in an axially immovable manner. Advantageously, the fixing unit may be used as a depth stop.

It is additionally proposed that the auxiliary spot-drilling suction extraction device be realized so as to be elastically deformable, in such a manner that the connection of the auxiliary spot-drilling suction extraction device to the drilling tool is effected by means of an elastic deformation. Advantageously, a connection between the auxiliary spot-drilling suction extraction device and the drilling tool can thereby be realized in a simple manner. The elastic deformation may be, for example, a stretching, expanding or spreading of the auxiliary spot-drilling suction extraction device.

It is furthermore proposed that the auxiliary spot-drilling suction extraction device be at least partially slotted. Preferably, a slot formed thus extends parallel to the longitudinal extent of the drilling tool. Preferably, the auxiliary spot-drilling suction extraction device may be spread in the region of the slot for connection to the drilling tool.

Alternatively or additionally, it is proposed that the auxiliary spot-drilling suction extraction device be of a multipart design, in particular having two housing half-shells. The individual parts of the auxiliary spot-drilling suction extraction device, or the housing half-shells, may be realized so as to be connectable to each other, for example by means of a clip connection or by means of a screwed connection.

It is furthermore proposed that the auxiliary spot-drilling suction extraction device have a fastening portion, via which the auxiliary spot-drilling suction extraction device is mounted on the drilling tool, and a suction extraction portion, which is designed to partially surround a drilling head of the drilling tool during spot-drilling.

It is additionally proposed that the fastening portion have a fastening element that, in the connected state, bears against the drilling tool. In particular, in the connected state the fastening element bears against at least two mutually opposite sides of the drilling tool. Preferably, the fastening element is realized as a hollow cylindrical bearing contact surface arranged on the radially inner side of the auxiliary spot-drilling suction extraction device.

It is furthermore proposed that the suction extraction portion have an inner diameter that is greater than an inner diameter of the fastening portion. This advantageously enables the drilling head to be surrounded by the auxiliary spot-drilling suction extraction device.

It is furthermore proposed that the suction extraction portion have a toothing. The toothing is realized, in particular, as an axial toothing. By means of the toothing, advantageously, it is possible to realize air intake openings.

BRIEF DESCRIPTION OF THE DRAWINGS

Further advantages are disclosed by the following description of the drawings. The drawings, the description and the claims contain numerous features in combination. Persons skilled in the art will expediently also consider them individually and combine them to form appropriate further combinations. References of features of different embodiments of the disclosure that substantially correspond to each other are denoted by the same number and with a letter that denotes the embodiment.

There are shown.

DETAILED DESCRIPTION

Figure 1:
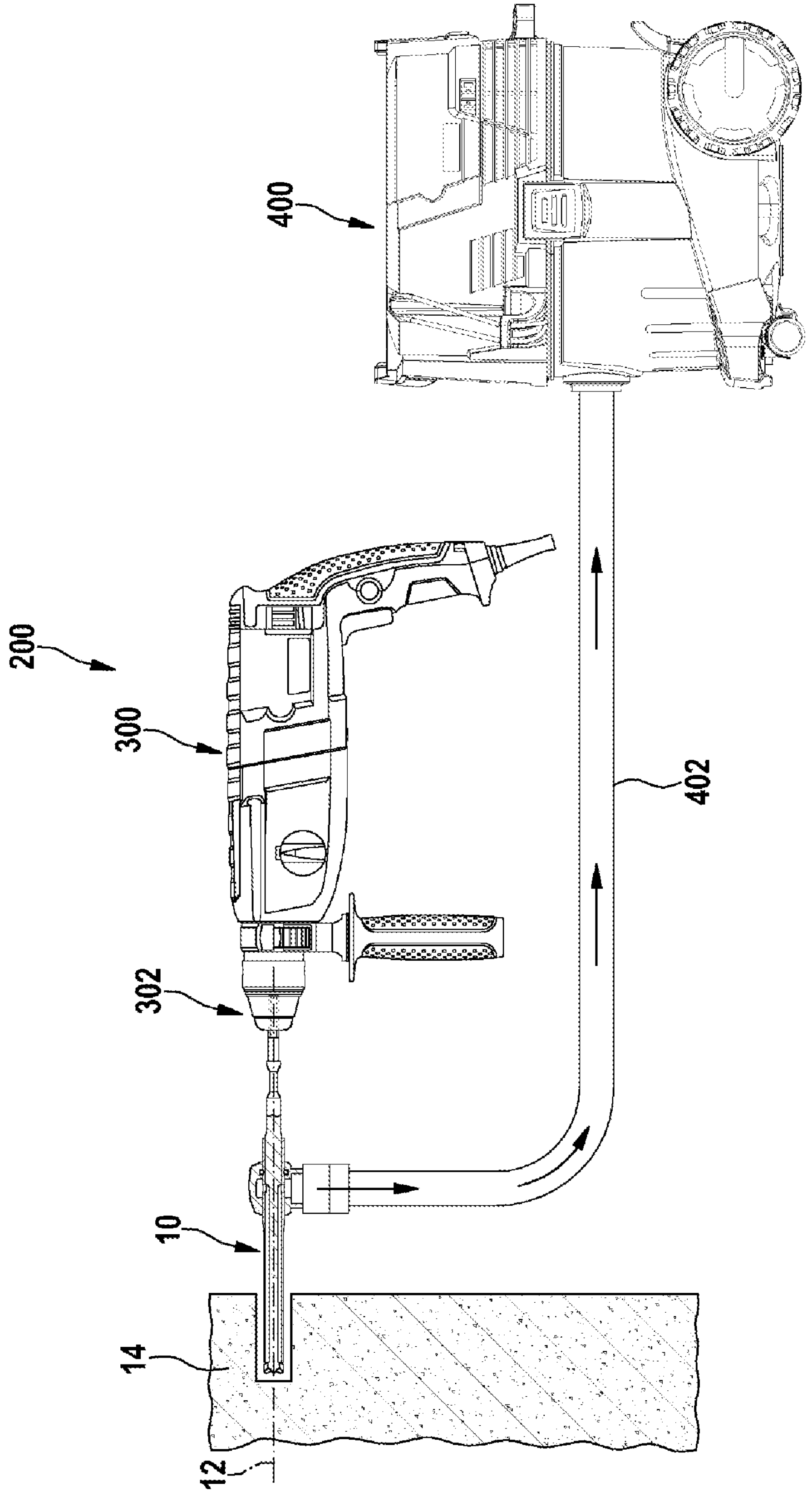
FIG. 1 a schematic side view of a tool system comprising a drilling tool, a hand-held power tool and a suction extraction device.

FIG. 1 shows a schematic view of a tool system 200. The tool system 200 comprises a drilling tool 10, a hand-held power tool 300 and a suction extraction device 400. The hand-held power tool 300 is realized, for example, as a hammer drill. The hand-held power tool 300 has a tool receiver 302, which is designed to receive an insert tool realized as a drilling tool 10. The hand-held power tool 300 comprises a drive unit, not represented, that comprises an electric motor, and a transmission that comprises a pneumatic percussion mechanism. By means of the drive unit and the transmission, the drilling tool 10, when in the coupled state, can be driven rotationally about a longitudinal axis 12 of the drilling tool 10 and in a linearly oscillating, or percussive, manner along the longitudinal axis 12.

Figure 2A:
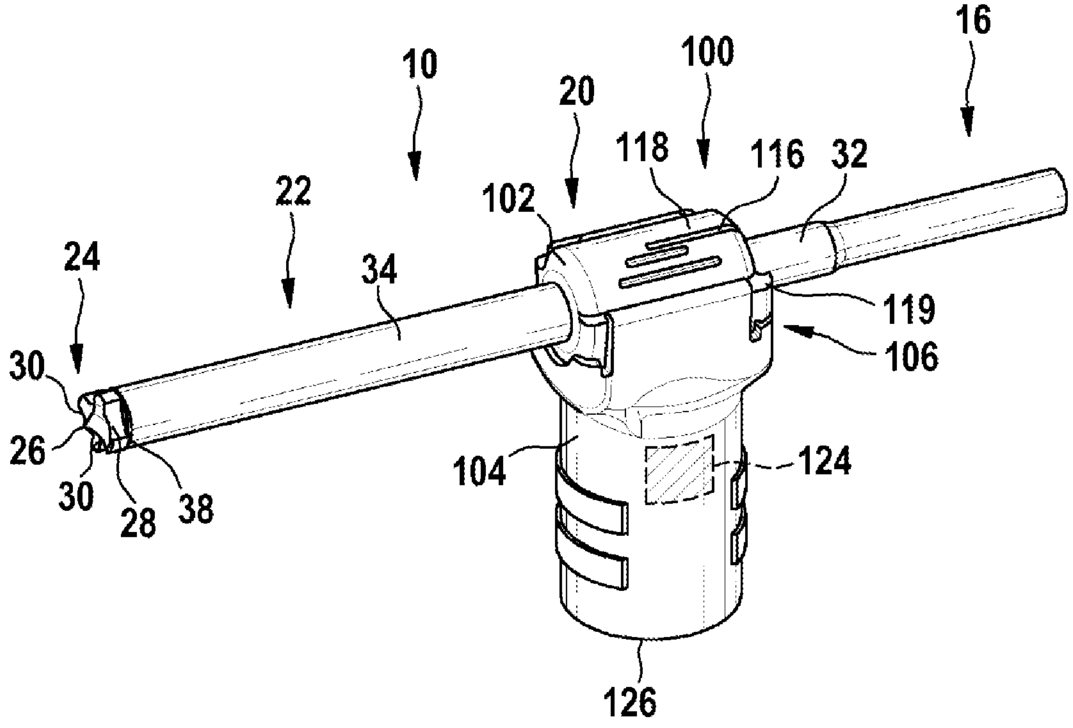
FIG. 2*a* a perspective view of a first embodiment of the drilling tool.
Figure 2B:
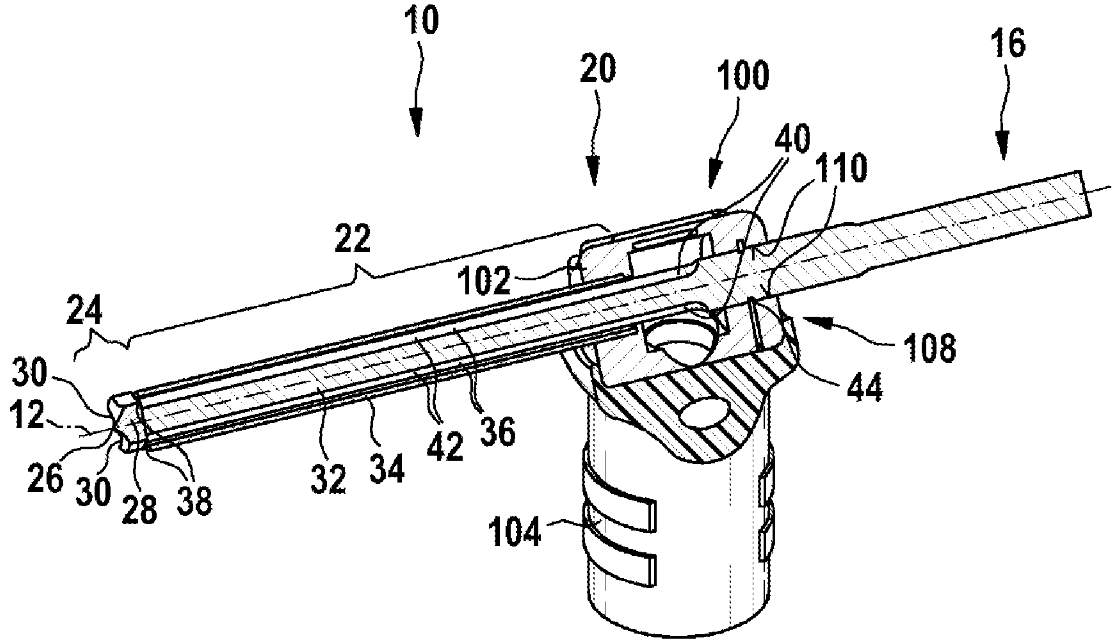
FIG. 2*b* a partial section through the drilling tool according to FIG. 2*a;*

The drilling tool 10 is realized as a rock drill-bit, and is shown in an enlarged perspective representation in FIG. 2*a*. In addition, FIG. 2*b* shows the drilling tool 10 in a partial section. The drilling tool 10 is designed, in particular, to produce a drilled hole in a workpiece 14, which may be, for example, masonry. The drilled hole is produced by means of a percussive motion of the drilling tool 10 along the longitudinal axis 12 and a rotational motion of the drilling tool 10 about the longitudinal axis 12. The drilling tool 10 has an insertion end 16, which is designed for coupling the drilling tool 10 to the hand-held power tool 300. The insertion end 16 is substantially cylindrical. The tool receiver 302 of the hand-held power tool 300 has clamping jaws, not represented, which, in the coupled state, are connected to the insertion end 16 of the drilling tool 10. Alternatively, it is also conceivable for the insertion end 16 to have form-fit elements that are realized as elongate groove and assigned to a standardized interface such as, for example, SDS-plus or SDS-max. Starting from the insertion end 16, the drilling tool 10, along its longitudinal extent, has a junction region 20 for connecting the drilling tool 10 to a suction extraction adapter 100, a conveying region 22 and a drilling head 24. The front end of the drilling tool 10 is formed by the drilling head 24, and the rear end of the drilling tool 10 is formed by the insertion end 16.

The suction extraction adapter 100 is connected, via a suction hose 402, to the suction extraction device 400 that is realized, for example, as an industrial vacuum cleaner. The suction extraction adapter 100 is of a multipart design, and has a first housing element 102 and a second housing element 104, which are connected to each other via a housing interface 106. The suction extraction adapter 100 and the drilling tool 10 are connected so as to be rotatable relative to each other.

The drilling head 24 is realized as a solid carbide head, and has a single cutting body 28. The cutting body 28 is welded-on, on a blunt end face of the main body 32 of the drilling tool 10. The cutting body 28 comprises four cutting elements 30, in particular two main cutting elements and two secondary cutting elements. The cutting body 28 is realized in the shape of a star, or cross, the cutting elements extending radially outward, starting from the mid-point of the cutting body 28. The cutting body 28 is realized as a single piece. The drilling head 24 has a tip 26, realized as a centering tip, which projects at the front end in such a manner that it is the first to come into contact with the workpiece 14. In the conveying region 22 the drilling tool 10 has a main body 32 and a sleeve element 34. Arranged radially between the main body 32 and the sleeve element 34 there are conveying channels 36 for removing drilling cuttings from the drilled hole. The conveying channels 36 extend fully through the conveying region 22, along the longitudinal axis 12. The conveying channels 36 have suction intake openings 38, via which drilling cuttings enter the conveying channel 36 as the drilled hole is being produced, and suction openings 40, via which the drilling cuttings exit the conveying channels 36.

The main body 32 has four outer grooves 42, which extend, rectilinearly and parallel to the longitudinal axis 12, through the conveying region 22. The grooves 42 are open axially at their end that faces toward the drilling head 24, at their end that faces away from the drilling head 24 the grooves are closed axially, and they open radially outward. In the conveying region 22 the grooves 42 are closed off radially by the sleeve element 34, in such a manner that the conveying channels 36 are closed in the circumferential direction in the conveying region 22. The sleeve element 34 is closed in the circumferential direction. The sleeve element 34 has a constant inner diameter. The conveying channels 36 each have a cross-sectional area 43 that is substantially constant. The cross-sectional area 43 of the conveying channel 36 is preferably constant over the entire conveying region 22. In other words, the profile of the conveying channel 36 has a substantially straight skeleton line. In particular, the skeleton line is substantially rectilinear substantially along the entire conveying channel 36, preferably between the suction intake opening 38 and the suction outlet opening 40. Alternatively, it is likewise conceivable for the grooves 42 to extend helically around the longitudinal axis 12.

Figure 2C:
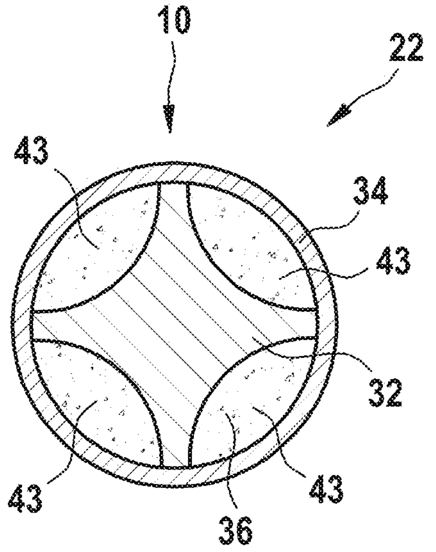
FIG. 2*c* a transverse section through the drilling tool according to FIG. 2*a* in the conveying region.

FIG. 2*c* shows a cross section through the conveying region 22 of the drilling tool 10. The four conveying channels 36*a* in this case have cross-sectional areas 43 of equal magnitude. In this embodiment, the sleeve element 34 bears against the main body 32. The drilling cuttings thus cannot move between the conveying channels. Alternatively, however, it is also conceivable that there is a gap (not represented) arranged between the sleeve element 34 and the main body 32. The gap may have a size of, for example, 0.3 mm. The drilling cuttings can move, via the gap, between the conveying channels 36. The gap advantageously enables the process of connection between the sleeve element 34 and the main body 32 to be improved.

The suction intake opening 38 is arranged in the region of the drilling head 24. In particular, the suction intake opening 38 is arranged on the side of the drilling head 24 that faces away from the tip 26. The suction intake opening 38 is formed by the axially open end of the conveying channel 36. In particular, the suction intake opening 38 is arranged in the transition region between the conveying region 22 and the drilling head 24. The suction intake opening 38 extends substantially perpendicularly in relation to the longitudinal axis 12 of the drilling tool 10. In particular, the suction intake opening 38 is opens forward in the direction of advance of the drilling tool 10. The suction intake opening 38 is delimited by the drilling head 24, or the cutting body 28, in such a manner that the suction intake opening 38 is smaller than the cross-sectional area 43 of the conveying channel 36 in the adjoining region.

The sleeve element 34 is designed to be rotatable relative to the main body 32. The sleeve element 34 is connected in a rotationally fixed manner to the suction extraction adapter 100, in particular to the first housing element 102 of the suction extraction adapter 100. The sleeve element 34 is made, for example, from a metallic material and is connected in a materially bonded manner to the suction extraction adapter 100, which is composed of a plastic. The materially bonded connection is effected in this case by means of an adhesive connection. Alternatively, it would also be conceivable for the sleeve element 34 and the suction extraction adapter 100 to be produced by a multi-component injection molding process. It would likewise be conceivable for both the sleeve element 34 and the suction extraction adapter 100 to be produced from a plastic, in particular produced as a single piece from the same plastic.

The sleeve element 34 is shorter than the grooves 42 forming the conveying channels 36. At the front end that faces toward the drilling head 24, the sleeve element 34 and the main body 32 terminate substantially at the same level, and thus form the suction intake openings 38. At the rear end that faces toward the insertion end 16, the grooves 42 in the main body 32 extend beyond the sleeve element 34, and thus form the suction outlet openings 40 of the drilling tool 10. The suction outlet openings 40 open substantially perpendicularly in relation to the suction intake openings 38, or radially in relation to the longitudinal axis 12 of the drilling tool 10. The cross-sectional area 43 of the conveying channel 36 reduces in the junction region 20, in particular in the region of the suction outlet opening 40. The grooves 42 are closed axially, in particular by a curved, or rounded, shape. when connected to the suction extraction adapter 100, the suction outlet openings 40 of the drilling tool 10 are arranged within the suction extraction adapter 100.

Figure 2D:
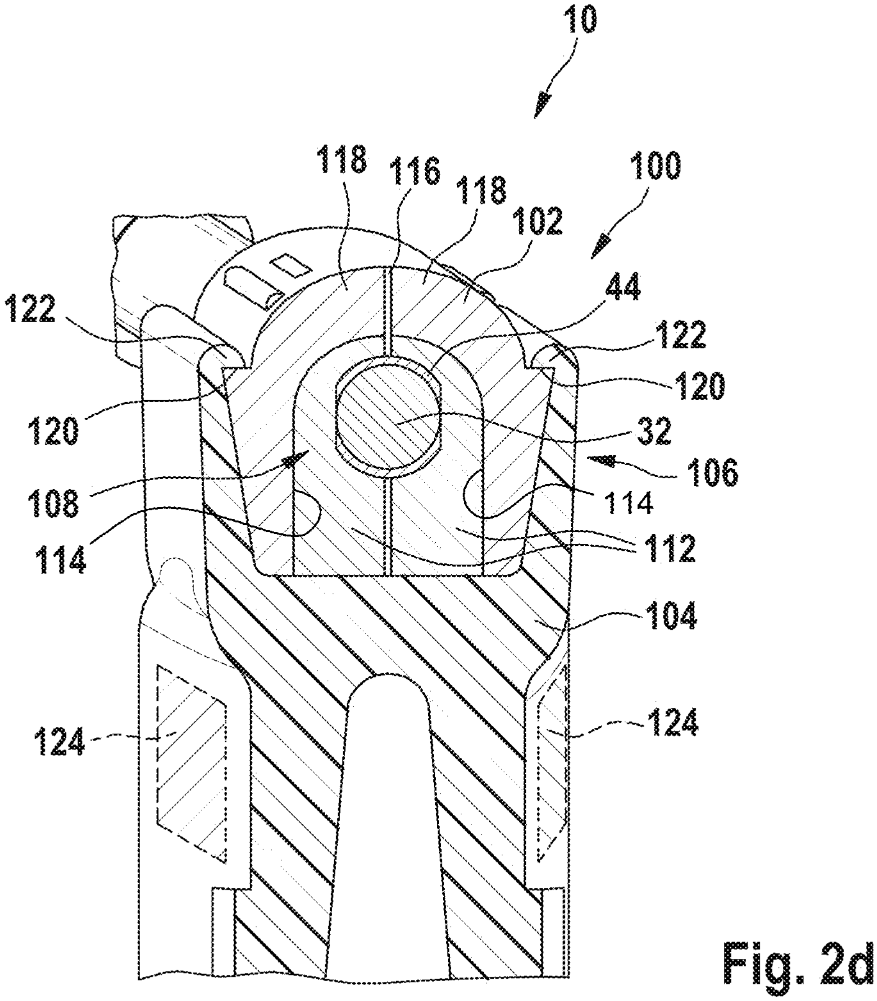
FIG. 2*d* a transverse section through the drilling tool according to FIG. 2*a* in the junction region.

The suction extraction adapter 100 is connected to the drilling tool 10, in particular to the main body 32 of the drilling tool 10, via a junction interface 108. FIG. 2*d* shows a cross section through the junction interface 108. Via the junction interface 108, the drilling tool 10 is connected in a form-fitting manner to the suction extraction adapter 100 in such a way that, when in operation, the drilling tool 10 rotates, or rotates and oscillates linearly, within the suction extraction adapter 100. The first housing element 102 of the suction extraction adapter 100 has a cylindrical recess in which the drilling tool 10, when having been connected, is in bearing contact. The cylindrical recess is delimited partially by a contact surface 110 that, in the connected state, is in bearing contact with the drilling tool 10. The contact surface 110 is, for example, cylindrical and bears against the main body 32 of the drilling tool 10.

The junction interface 108 has, for example, two mutually corresponding securing elements 44, 112, by means of which the first housing element 102 of the suction extraction adapter 100 is axially secured on the main body 32 of the drilling tool 10. The first securing element 44 is assigned to the drilling tool 10. The first securing element 44 is realized as an annular groove arranged in the main body 32 of the drilling tool 10. The first securing element 44 is arranged in front of the conveying channel 36 in the direction of advance of the drilling tool 10. The second securing element 112 is assigned to the suction extraction adapter 100. The second securing element 112 is realized as a form-fit element and, for example, as a small metal plate. The suction extraction adapter 100 has, for example, two second securing elements 112. The securing elements 112 may be connected in a materially bonded manner and/or in a force-fitting manner and/or in a form-fitting manner to the suction extraction adapter 100. In this embodiment, the suction extraction adapter 100 has two receiving pockets 114, which are designed to receive the securing elements 112. Via the receiving pockets 114, the securing elements 112 can be inserted into the suction extraction adapter 100, in particular into the first housing element 102 of the suction extraction adapter 100, from the outside. In this embodiment, the connection is effected in a materially bonded manner, by means of an adhesive connection. It would also be conceivable, however, for the receiving pocket 114 to have a conical profile in order to receive the securing element 112 in a force-fitting manner. Furthermore, it would likewise be conceivable for the securing elements 112 realized as small metal plates to be already connected in the production process of the plastic suction extraction adapter 100, in that the small metal plates are used as an insert in the injection molding process. When the drilling tool 10 has been connected to the suction extraction adapter 100, the small metal plates are partially arranged in the groove in such a manner that a rotation of the main body 32 relative to the suction extraction adapter 100, or relative to the sleeve element 34, is possible, and an axial movement of the main body 32 relative to the suction extraction adapter 100, or relative to the sleeve element 34, is substantially prevented. Advantageously, both of the components that form the securing elements 44, 112 are composed of a metallic material, in order to achieve maximum durability.

The suction extraction adapter 100, and thus also the sleeve element 34, are separably connected to the main body 32 of the drilling tool 10. A separable connection in this context is to be understood to mean, in particular, a connection that can be undone without the use of any tool. Advantageously, in the event of a blockage of the conveying channels 36, the sleeve element 34 can be separated from the main body 32, enabling the conveying channel 36 to be exposed and cleaned. For this purpose, the suction extraction adapter 100, in particular the first housing element 102 of the suction extraction adapter 100, is designed to be at least partially elastic. Preferably, the suction extraction adapter 100 is of such an elastic design that, in the connected state, a force acting upon the suction extraction adapter 100 renders possible a relative movement between the two securing elements 112 and/or one of the securing elements 112 and a fixed region of the suction extraction adapter 100, in particular of the first housing element 102. For example, the first housing element 102 has a slot 116, which divides the first housing element 102 regionally into two housing portions 118 that are movable relative to each other. The slot 116 is preferably arranged centrally, and preferably extends parallel to the longitudinal axis 12 of the drilling tool 10. Furthermore, the housing portions 118 each have a grip element 119, which is designed to facilitate handling. Each of the securing elements 112 is connected, respectively, to one of the housing portions 118, such that a force acting upon the first housing element 102 of the suction extraction adapter 100 enables the two housing portions 118, and thus the two securing elements 112, to be moved away from each other, and consequently the form-fitting connection between the suction extraction adapter 100 and the drilling tool 10, or the sleeve element 34 and the main body 32, can be undone.

If, as in this embodiment, the insertion end 16 is realized as a single piece with the main body 32 of the drilling tool 10, the sleeve element 34 with the suction extraction adapter 100 can only be pushed onto the main body 32 of the drilling tool 10 if an outer diameter 17 of the insertion end 16 is smaller than an outer diameter 23 of the conveying region 22.

FIG. 2*d* shows a section through the two-part suction extraction adapter 100. The housing interface 106, via which the first and the second housing element 102, 104 are connected to each other, is realized, for example, to effect a latching connection. The first housing element 102 has a relief cut element 120, in which there engages a latching element 122 realized, exemplarily, as a latching arm, of the second housing element 104. The latching element 122 is preferably realized as a single piece with the second housing element 104. The second housing element 104 is preferably made from a plastic. In order to release the relief cut between the relief cut element 120 and the latching element 122, the latching element 122 can be pressed away directly by a user. Preferably, the second housing element 104 has at least one actuation element 124, by means of which the position of the latching elements 122 can be altered. The actuation elements 124 are mechanically connected to the latching elements 122. In particular, the actuation elements 124 are connected to the latching elements 122 in such a manner that a force applied inwardly to the actuation element causes an outward movement of the latching element 122. The actuation elements 124 are realized as a single piece with the second housing element 104. The actuation elements 124 are realized as a marked outer region of the second housing element 104, such that the user can see where actuation is to be effected. In the region of the actuation elements 124 the second housing element 104 is hollow on the inside, in particular the wall thickness is reduced in the region of the actuation elements 124. The suction extraction adapter 100, in particular the second housing element 104 of the suction extraction adapter 100, additionally has a second housing interface 126, which is designed for coupling the suction extraction adapter 100 to a suction extraction device 400. The second housing interface 126 is realized, for example, as a conically shaped cavity, which can be connected to a suction hose 402 of a suction extraction device 400. Also conceivable, however, are other possibilities for connection to the suction extraction device 400, or to a suction hose 402 of a suction extraction device 400, such as, for example, a bayonet closure. The first and the second housing interface 106, 126 are arranged on different sides of the second housing element 104. Preferably, the suction hose 402 is accommodated in the suction extraction adapter 100 in such a manner that it projects into the region of the actuation elements 124, thereby reinforcing the second housing element 104 and preventing actuation of the actuation elements 124. It can thereby be ensured that the two housing elements 102, 104 are not unintentionally separated from each other.

Figure 3:
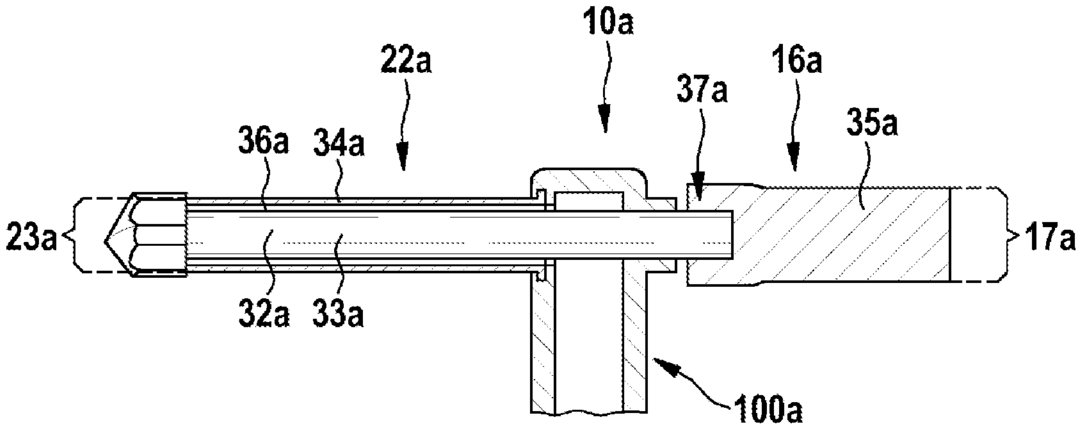
FIG. 3 a longitudinal section of a second embodiment of the drilling tool.

Shown schematically in FIG. 3 is an alternative embodiment of the drilling tool 10 according to FIG. 2*a*, in which an outer diameter 17*a* of an insertion end 16*a* is greater than an outer diameter 23*a* of the conveying region 22*a*. In this embodiment, the sleeve element 34*a* is likewise realized so as to be rotatable in relation to a main body 32*a* of the drilling tool 10*a* when in the connected state. The sleeve element 34*a* is connected to a suction extraction adapter 100*a* in a materially bonded manner and, as described previously, is secured axially on the main body 32*a* (not represented). The main body 32*a* is realized in two parts, a first main-body part 33*a* being arranged in the conveying region 221, and a second main-body part 35*a* forming the insertion end 16*a*. The first main-body part 33*a* is connected to the second main-body part 35*a* in a force-fitting and form-fitting manner, in particular connected by means of a joint 37*a* realized as a thread. The joint 37*a* is preferably realized in such a manner that the two main-body parts 33*a*, 35*a* are separably connected to each other. Thus, in order to clean the conveying region 22*a*, the insertion end 16*a* can first be separated from the conveying region 22*a*, and in a second step the connection between the suction extraction adapter 100*a* and the main body 32*a* can be undone in order to expose the conveying channels 36*a*.

Figure 4:
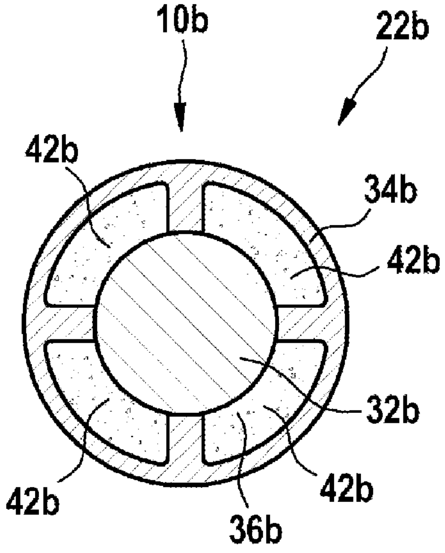
FIG. 4 a cross section through a third embodiment of the drilling tool in the conveying region.

FIG. 4 shows a cross section through a conveying region 22*b* of an alternative embodiment of the drilling tool 10 according to FIG. 2*a-d*. The drilling tool 10*b* in this case differs from the drilling tool 10 in the design of the conveying channels 36*b*. The conveying channels 36*b* are arranged radially between a main body 32*b* and a sleeve element 34*b*. The main body 32*b* is cylindrical in the conveying region 22*b* of the drilling tool 10*b*, the circumferential surface of the main body 32*b* having no grooves whatsoever. The sleeve element 34*b*, on the other hand, has webs 39*b* that extend radially inward. In particular, the webs 39*b* bear at least partially against the main body 32*b*. The webs 39*b* extend continuously, along the longitudinal axis 12*b* of the drilling tool 10*b*, over the entire conveying region 22*b*, such that a conveying channel 36*b* is formed in each case between the webs 39*b*. In this embodiment, the sleeve element 34*b* is made from a plastic material, and preferably forms a single piece with a suction extraction adapter, not represented, in particular with a first housing element of a suction extraction adapter. The main body 32*b* is made from a metal.

FIG. 5*a* to FIG. 5*h* show alternative embodiments of the drilling tool 10*b* according to FIG. 2*a-d*, in which the conveying channels 36*c-j* in each case are arranged radially between a main body 32*c-j* and a sleeve element 34*c-j*, the drilling tools 10*c-j* differing in the fastening of the suction extraction adapter 100*c-j*. The sleeve elements 34*c-j* in this case are connected so as to be rotatable in relation to the main body 32*c-j*, and are connected in a rotationally fixed manner to the suction extraction adapter 100*c-j*. The suction extraction adapters 100*c-j* may be realized as a single part or, as described previously, of a multipart design.

Figure 5A:
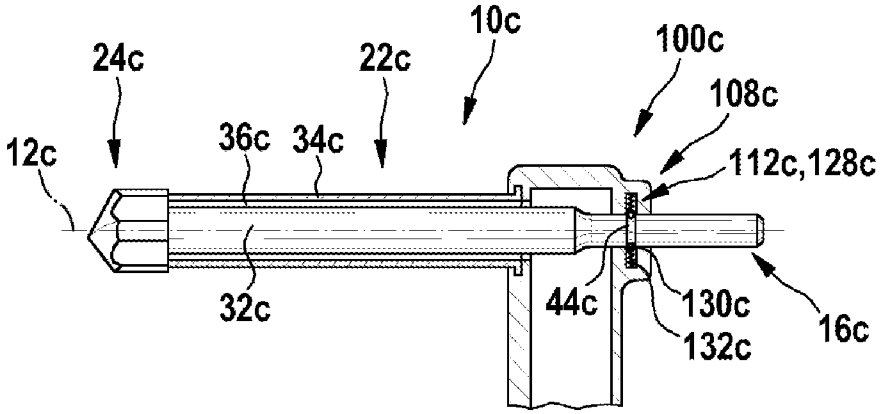
FIG. 5*a* a longitudinal section of a fourth embodiment of the drilling tool.

In the embodiment according to FIG. 5*a*, the sleeve element 34*c* is tubular, and at its end that faces away from the drilling head 24*c* it is bent outward so as to form a collar. The sleeve element 34*c* is made from a metallic material. The sleeve element 34*c* is connected in a materially bonded and rotationally fixed manner to the suction extraction adapter 100*c*. The suction extraction adapter 100*c* is realized as a single piece, and made from a plastic. The suction extraction adapter 100*c* is connected to the main body 32*c* of the drilling tool 10*c* via a junction interface 108*c*. The junction interface 108*c* has two mutually corresponding securing elements 44*c*, 112*c*, by means of which the suction extraction adapter 100*c* is secured axially on the main body 32*c* of the drilling tool 10*c*. The first securing element 44*c* is assigned to the drilling tool 10*c*. The first securing element 44*c* is realized as an annular groove, which is arranged, in the main body 32*c* of the drilling tool 10*c*, between the insertion end 16*c* and the conveying region 22*c*. The second securing element 112*c* is assigned to the suction extraction adapter 100*c*. The second securing element 112*c* is realized as a latching element 128*c* in the form of a latching ball. The latching element 128*c* is mounted in a linearly movable manner in the suction extraction adapter 100*c*, in particular mounted radially in relation to the longitudinal axis 12*c* of the drilling tool 10*c*. The latching element 128*c* is composed, for example, of a metallic ball 130*c* and a spring 132*c* that applies a force to the ball 130*c*. The spring 132*c* is arranged between the ball 130*c* and a housing part of the suction extraction adapter 100*c* in such a manner that the ball 130*c* is subjected to a force in the direction of the main body 32*c* of the drilling tool 10*c* and, upon connection of the suction extraction adapter 100*c*, snaps into the securing element 44*c* of the drilling tool 10*c* that is realized as a groove. The junction interface 108*c* has, for example, two mutually opposite second securing elements 112*c*. It is likewise conceivable, however, for the junction interface 108*c* to have only one second securing element 112*c*, or to have more than two second securing elements 112.

Figure 5B:
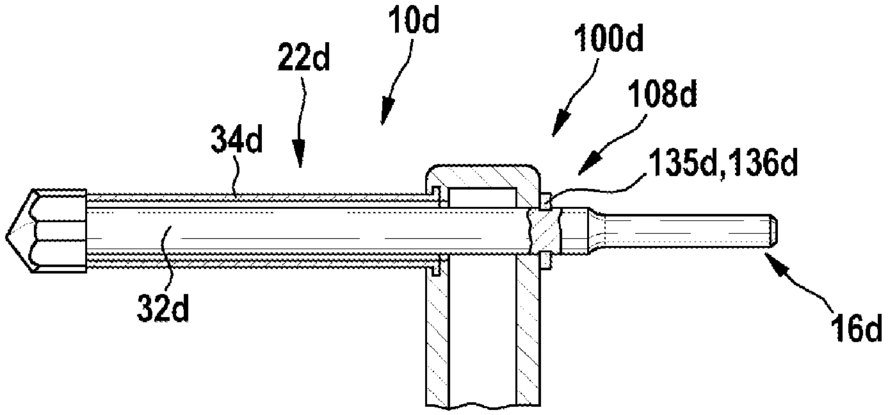
FIG. 5*b* a longitudinal section of a fifth embodiment of the drilling tool.

In the embodiment according to FIG. 5*b*, the sleeve element 34*d* is tubular and has a constant outer diameter. The sleeve element 34*d* is made from a metallic material. The sleeve element 34*d* is connected in a materially bonded and rotationally fixed manner to the suction extraction adapter 100*d*. The suction extraction adapter 100*d* is realized as a single piece, and is made from a plastic. The suction extraction adapter 100*d* is connected to the main body 32*d* of the drilling tool 10*d* via a junction interface 108*d*. The junction interface 108*d* has a securing element 134*d*, by means of which the suction extraction adapter 100*d* is secured axially on the main body 32*d* of the drilling tool 10*d*. The securing element 134*d* is realized as a securing ring 136*d*, for example as a snap ring. To connect the suction extraction adapter 100*d* to the drilling tool 10*d*, the suction extraction adapter 100*d* is pushed, with the sleeve element 34*d* foremost, onto the main body 32*d* of the drilling tool 10*d* via the insertion end 16*d*. When the suction extraction adapter 100*d* has reached its end position, the securing ring 136*d* is fitted on the main body 32*d*, behind the suction extraction adapter 100*d* in the direction of advance. The securing ring 136*d* is fastened in a force-fitting and axially immovable manner to the main body 32*d* of the drilling tool 10*d*. The securing ring 136*d* supports the suction extraction adapter 100*d* in the axial direction.

Figure 5C:
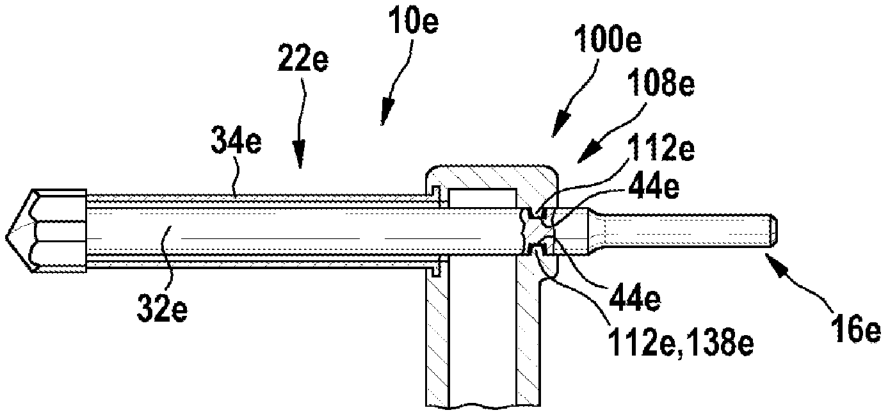
FIG. 5*c* a longitudinal section of a fifth embodiment of the drilling tool.

In the embodiment according to FIG. 5*c*, the sleeve element 34*e* is tubular. The sleeve element 34*e* is made of plastic and forms a single piece with the suction extraction adapter 100*e*. The suction extraction adapter 100*e* is connected to the main body 32*e* of the drilling tool 10*e* via a junction interface 108*e*. The junction interface 108*e* has two mutually corresponding securing elements 44*e*, 112*e*, by means of which the suction extraction adapter 100*e* is secured axially on the main body 32*e* of the drilling tool 10*e*. The first securing element 44*e* is assigned to the drilling tool 10*e*. The first securing element 44*e* is realized as an annular groove arranged, in the main body 32*e* of the drilling tool 10*e*, between the insertion end 16*e* and the conveying region 22*e*. The second securing element 112*e* is assigned to the suction extraction adapter 100*e*. The second securing element 112*e* forms a single piece with the suction extraction adapter 100*e*. Preferably, the second securing element 112*e* is realized as a lug 138*e* that extends radially in the direction of the longitudinal axis 12*e* of the drilling tool 10*e*. In particular, the suction extraction adapter 100*e* has two second securing elements 112*e*, arranged opposite each other. Also conceivable is an alternative arrangement such as, for example, adjacent to each other. It is likewise conceivable for the suction extraction adapter 100*e* to have more than two second securing elements 112*e*, or to have only a single second securing element 112*e*. The suction extraction adapter 100*e* is of an elastic design, such that the position of the second securing elements 112*e*, and/or their shape, can be altered by a force applied to the suction extraction adapter 100*e*. In the connected state, the securing elements 112*e* realized as lugs 138*e* are in engagement with the first securing element 44*e* of the drilling tool 10*e*, which is realized as an annular groove. For the purpose of undoing the connection, the radial position of the lugs 138*e* with respect to the longitudinal axis 12*e* can be altered by application of force to an outer face of the suction extraction adapter 100*e*, in such a manner that the lugs 138*e* move out of the annular groove and the connection can be undone.

Figure 5D:
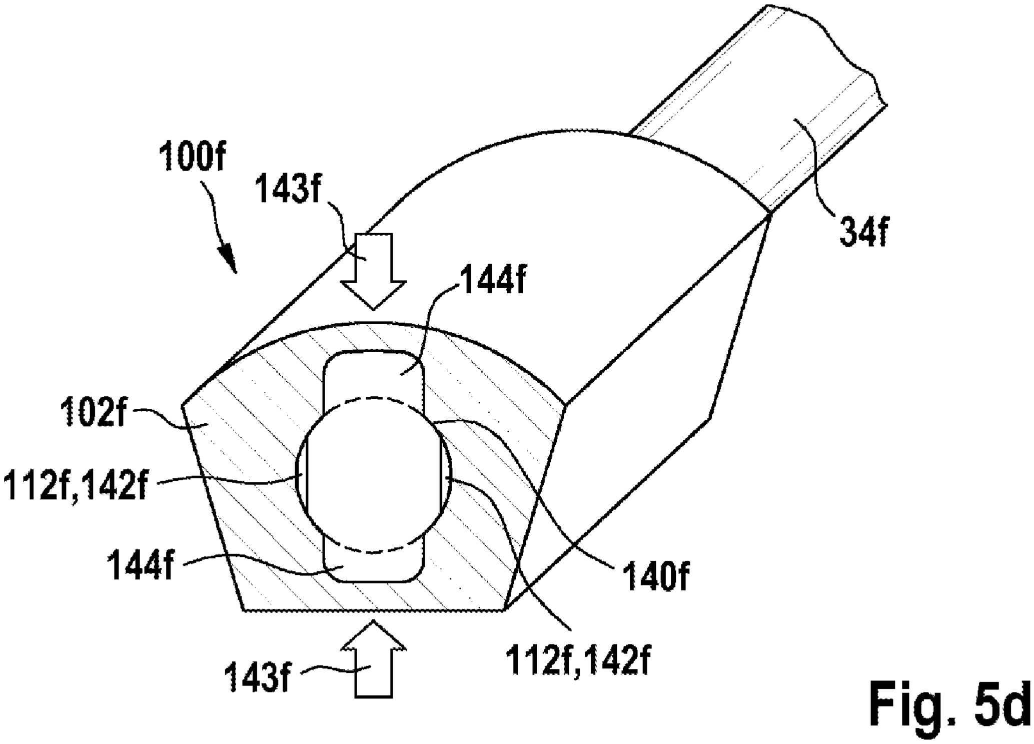
FIG. 5*d* a cross section of a sixth embodiment of the drilling tool in the junction region.

FIG. 5*d* shows a further embodiment of the junction interface 108*f*, in a cross section through a suction extraction adapter 100*f*. The sleeve element 34*f* is made from a metallic material, and is connected in a materially bonded and rotationally fixed manner to the suction extraction adapter 100*f*. The suction extraction adapter 100*f* is of a multipart design, and made from a plastic. In this case, only a first housing element 102*f* is shown, which is designed to be connectable to a second housing element, not represented. The connection in this case may be effected by means of a housing interface 106, as described previously, or as to be described in the following exemplary embodiments. It is likewise conceivable for the suction extraction adapter 100*f* to be realized as a single part.

The junction interface 108*f* has two mutually corresponding securing elements 112*f*, by means of which the suction extraction adapter 100*f* is secured axially on the main body 32*f* of the drilling tool 10*f*. The first securing element (not represented) is assigned to the drilling tool, and is realized as an annular groove in the main body (not represented) of the drilling tool. The second securing element 112*f* is assigned to the suction extraction adapter 100*f*. For the purpose of connecting the first housing element 102*f* to the main body of the drilling tool, the suction extraction adapter 100*f* is pushed, with the sleeve element 34*f* foremost, onto the main body via the insertion end, as also already in the previous embodiments. The main body is received in a recess of the first housing element 102*f*, which extends through the first housing element 102*f* and in this case has, at least partially, a substantially circular cross section 140*f*. The circular cross section 140*f* is matched, in particular, to the external geometry of the main body. The recess, or the cross section 140*f* of the recess, is thus at least partially delimited by contact surfaces 110 with which the suction extraction adapter 100*f* is in bearing contact when being connected, or when having been connected, to the drilling tool. The second securing elements 112*f* of the junction interface 108*f* are realized as small metal plates 142*f*, which overlap partially with the recess. The small metal plates 142*f* have a thickness that corresponds substantially to the width of the first securing element realized as an annular groove. The suction extraction adapter 100*f* has, for example, two second securing elements 112*f*, arranged opposite each other. The second securing elements 112*f* are in particular arranged in such a manner that they project into the cross section 140*f* of the recess. The second securing elements 112*f* may be connected to the suction extraction adapter 100*f* in a materially bonded manner or also, alternatively, realized as inserts in an injection molding process. In the connected state, the small metal plates are arranged in the annular groove of the drilling tool, and thereby prevent an axial movement of the suction extraction adapter 100*f* relative to the drilling tool.

The suction extraction adapter 100*f*, in particular the first housing element 102*f*, is advantageously designed to be elastic, such that the second securing elements 112*f* can be moved radially outward by a pressure 143*f* upon the outer face of the suction extraction adapter 100*f* in such a manner that they are brought out of engagement with the first securing element. In the embodiment shown, the pressure 143*f* is effected substantially perpendicularly in relation to the direction of movement of the second securing element 112*f*. The required elasticity may be provided, for example, through the choice of material, or choice of plastic. It is likewise conceivable for the suction extraction adapter 100*f* to have weakened regions of material 144*f*, for example in the form of further recesses that are connected to the recess, such that in this region the suction extraction adapter 100*f* is more elastic and more easily deformable.

In the embodiments according to FIGS. 5*e-j*, the suction extraction adapter 100, unlike the previous embodiments, does not have a fixedly connected second securing element 112, the axial securing instead being produced in an additional step by means of a third securing element 146.

Figure 5E:
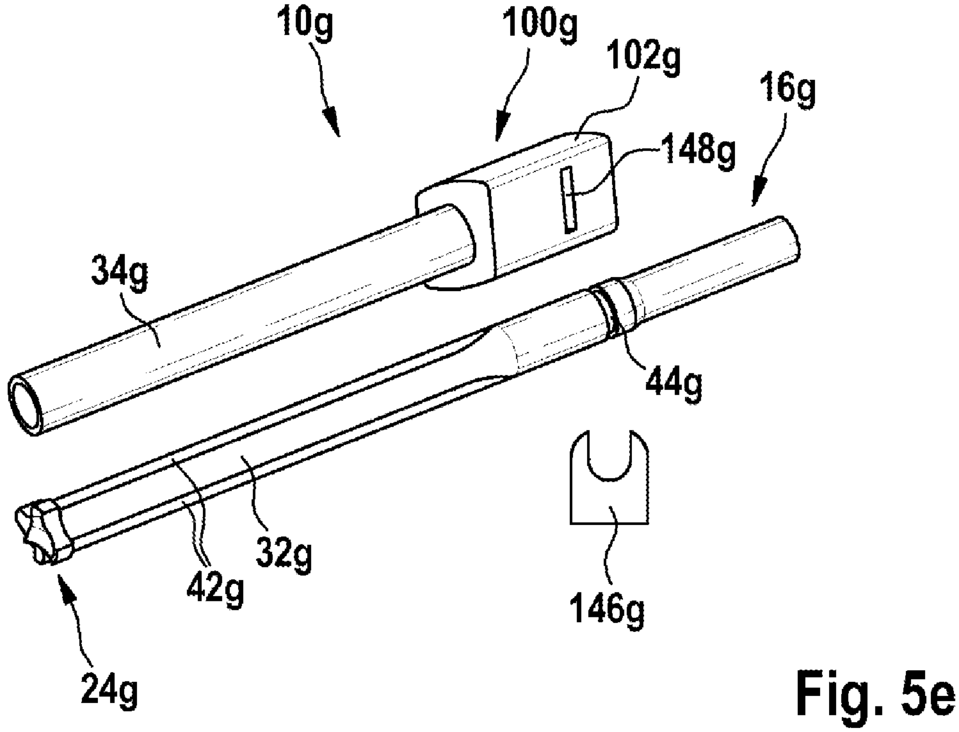
FIG. 5*e* a perspective view of a seventh embodiment of the drilling tool in the non-mounted state.

FIG. 5*e* shows a perspective view of a sleeve element 34*g* that is connected in a materially bonded manner to a suction extraction adapter 100*g*. The suction extraction adapter 100*g* is of a multipart design. The suction extraction adapter 100*g*, in particular the first housing element 102*g* of the suction extraction adapter 100*g*, has a securing-element receiver 148*g* that is designed to receive a third securing element 146*g*. The sleeve element 34*g* is designed to be separably connectable to a main body 32*g* of a drilling tool 10*g* that, at its rear end, has an insertion end 16*g*, and at the front end of which a drilling head 24*g* is fastened by means of a welded joint. The main body 32*g* has rectilinear grooves 42*g*, which extend from the front end toward the rear end, and which terminate before the insertion end 16*g*. Between the grooves 42*g* and the insertion end 16*g* the main body 32*g* has a first securing element 44*g* realized as an annular groove. The connection is effected, in a first step, in that the sleeve element 34*g* is pushed onto the main body 32*g*, via the insertion end 16*g*. The sleeve element 34*g* is pushed until the securing-element receiver 148*g* is positioned in the region of the first securing element 44*g*. Then, in a second step, to effect axial securing, the third securing element 148*g*, which is realized as a clip, is brought into engagement with the first securing element 44*g* via the securing-element receiver 148*g*. Advantageously, the inner contour of the securing-element receiver 148*g* is at least partially conical, in order produce a force-fitting connection between the suction extraction adapter 100*g*, in particular the securing-element receiver 148*g*, and the third securing element 146*g*. It is also conceivable, however, for the third securing element 146*g* to be held in the securing-element receiver 148*g*, by means of a form-fitting connection, by a second housing element 104*g* of the suction extraction adapter 100*g* (see FIG. 5*f*).

Figure 5F:
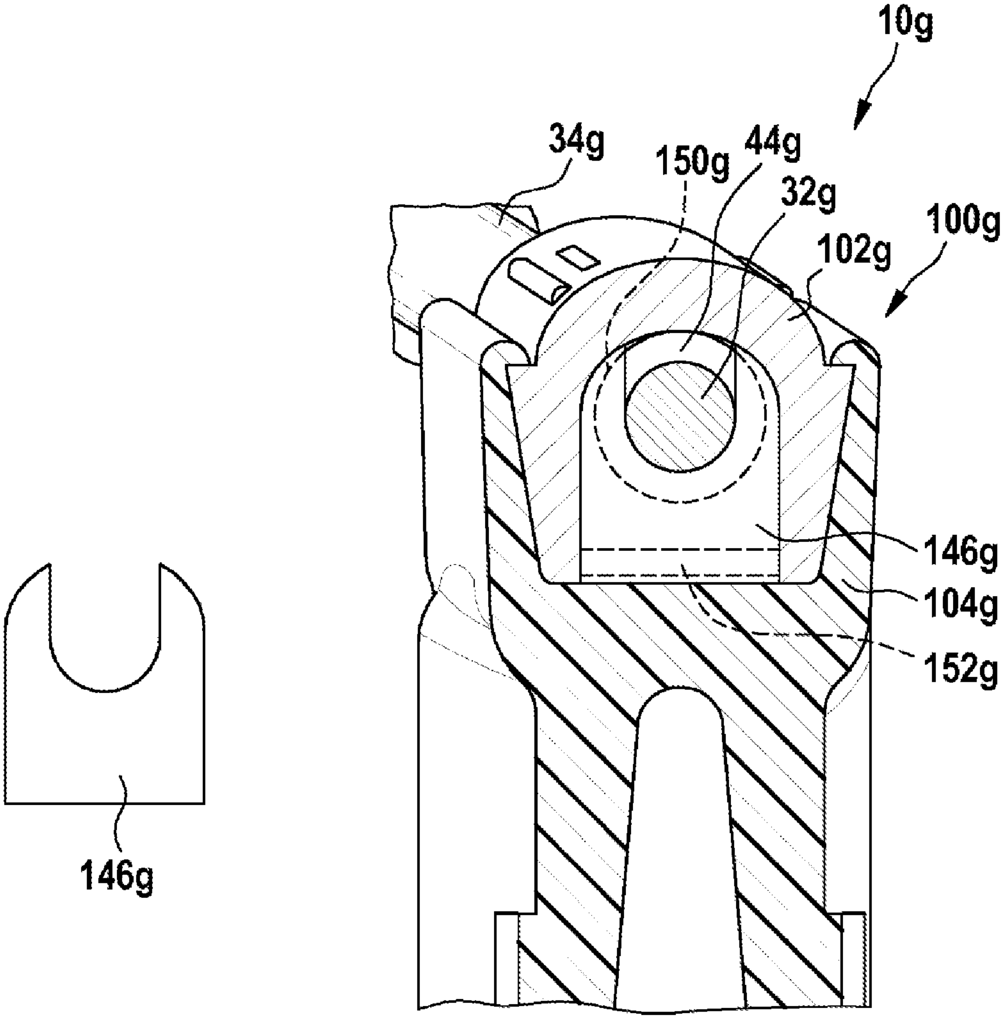
FIG. 5*f* a cross section through the drilling tool according to FIG. 5*e;*

The first securing element 44*g*, the securing-element receiver 148*g* and the third securing element 146*g* form a junction interface 108*g*. FIG. 5*f* shows a cross section through the junction interface 108*g* in the connected state. The third securing element 146*g*, realized as a clip, encompasses the main body 32*g* of the drilling tool 10*g* in the manner of tongs in the region of the annular groove and bears partially radially against the main body 32*g* in the annular groove. A relative movement in the axial direction is prevented by the clip, in that the clip has both a drill-bit stop region 150*g*, in which the clip impinges axially on the main body 32*g*, in particular on the widened diameter portion of the main body 32*g* directly adjacent to the annular groove, and an adapter stop region 152*g*, in which the clip impinges on the suction extraction adapter 100*g*, in particular on the first housing element 102*g* of the suction extraction adapter 100*g*.

Figure 5G:
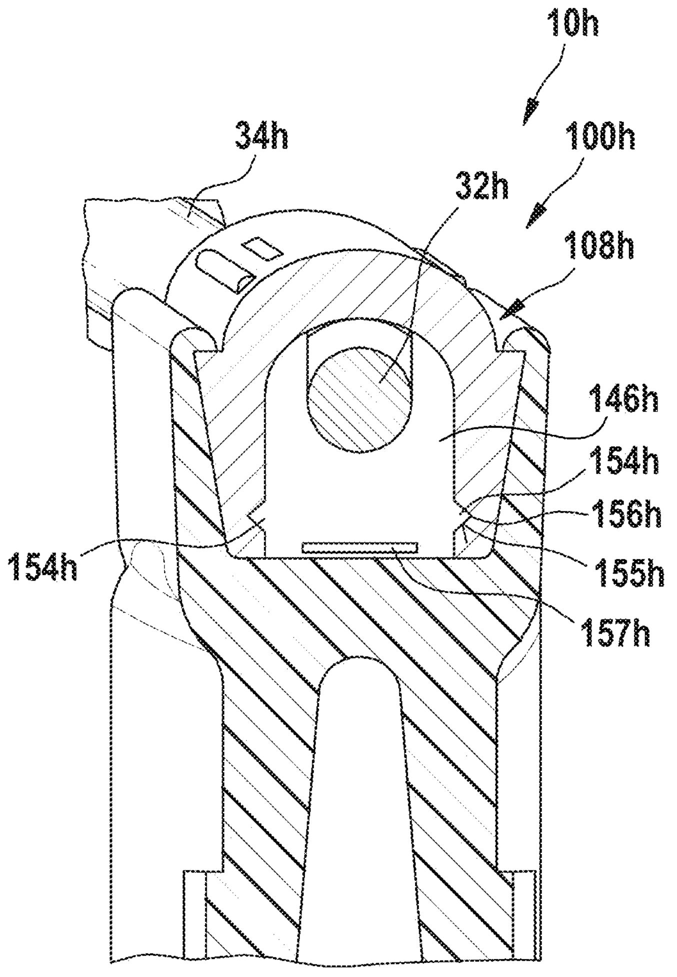
FIG. 5*g* a cross section of an eighth embodiment of the drilling tool.

FIG. 5*g* shows an alternative embodiment of the third securing element 146*h*, in a cross section through the junction interface 108*h*. The third securing element 146*h* differs from the previously described securing element 146*h* substantially in the connection of the third securing element 146*h* to the suction extraction adapter 100*h*, which is effected in a force-fitting and form-fitting manner. The third securing element 146*h* is made from a metallic material, and the suction extraction adapter is made from a plastic, which preferably has a minimum elasticity. For the purpose of force-fitting and form-fitting connection, the securing element 146*h* has laterally projecting arms 154*h*, which are arranged in corresponding pockets 156*h* in the suction extraction adapter 100*h*, in particular in the first housing element 102*h* of the suction extraction adapter 100*h*, and thus form a relief cut. The arms have an outer contour 155*h* that is inclined relative to the direction of connection. The outer contour 155*h* has the shape, for example, of a pyramid. The suction extraction adapter 100*h* is partially spread, both during insertion of the clip into the securing-element receiver 148*h* of the suction extraction adapter 100*h* and during release of the clip from the suction extraction adapter 100*h*, as a result of the elasticity of the suction extraction adapter 100*h* and the inclined outer contour 155*h* of the arms 154*h*. To facilitate undoing of the connection between the third securing element 146*h* and the suction extraction adapter 100*h*, the third securing element 146*h* advantageously has a recess 157*h*. The recess 157*h* is, for example, rectangular and arranged on the side of the clip that faces away from the main body 32*h*. The clip can easily be released by means of a hook-shaped tool, not represented, that engages in the recess 157*h*.

Figure 5H:
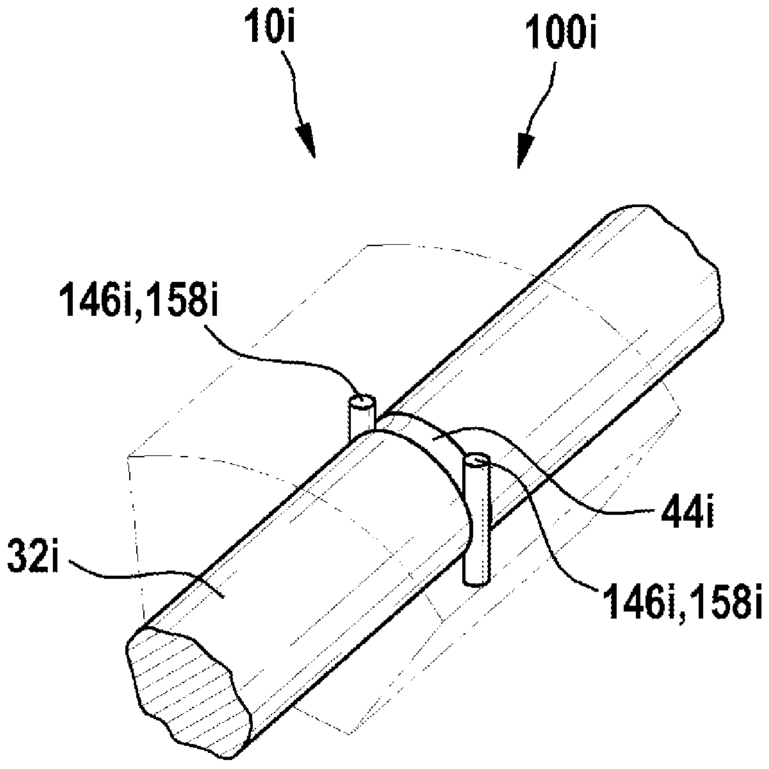
FIG. 5*h* a perspective view of another embodiment of the junction interface of the drilling tool.

FIG. 5*h* shows an alternative embodiment of the junction interface 108. The first securing element 44*i* is realized as an annular groove in a main body 32*i* of the drilling tool 10*i*, and the suction extraction adapter 100*h* has two cylindrical securing-element receivers 148*i*, which are designed to receive two third securing elements 146*i*. The third securing elements 146*i* are realized as pins, and are held in a force-fitting manner in the suction extraction adapter 100*i*. In the connected state, the pins 158*i* are arranged on two opposite sites in the annular groove of the drilling tool 10*i*, such that a rotational movement is possible, but an axial movement of the main body 32*i* relative to the suction extraction adapter 100*i* is prevented. Preferably, the suction extraction adapter 100*i* has housing openings (not represented), the size, or diameter, of which is less than the diameter of the pins 158*i*, and via which the pins 158*i* can be released from the securing-element receiver 148*i* by means of a tool such as, for example, a small thin needle.

Figure 5I:
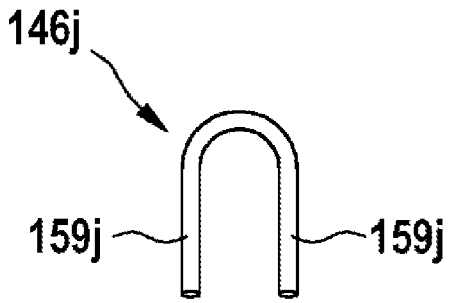
FIG. 5*i* an end view of another embodiment of a third securing element of the drilling tool.

FIG. 5*i* shows an alternative embodiment of the third securing element 146*i* realized as a pin 158*i*. The two third securing elements 146*j* are joined together at one of their ends. In particular, the two third securing elements 146*j* are realized as a single piece and are U-shaped, the ends of the third securing element 146*j* in each case forming a pin element 159*j*.

Figure 6A:
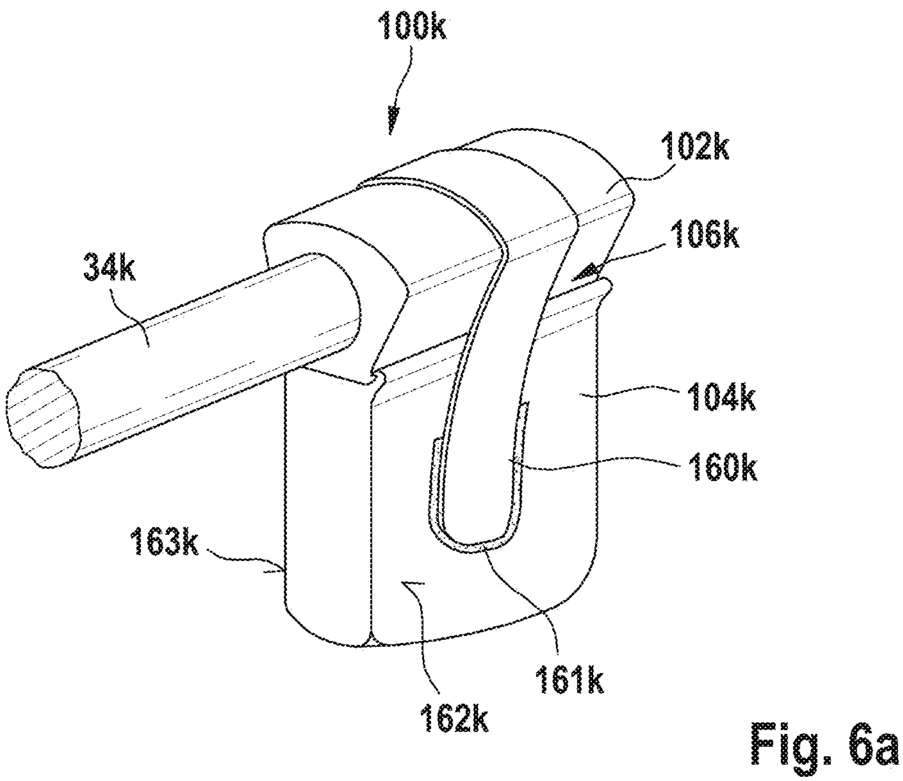
FIG. 6*a* a perspective view of a multipart suction extraction adapter of a ninth embodiment of the drilling tool.
Figure 6B:
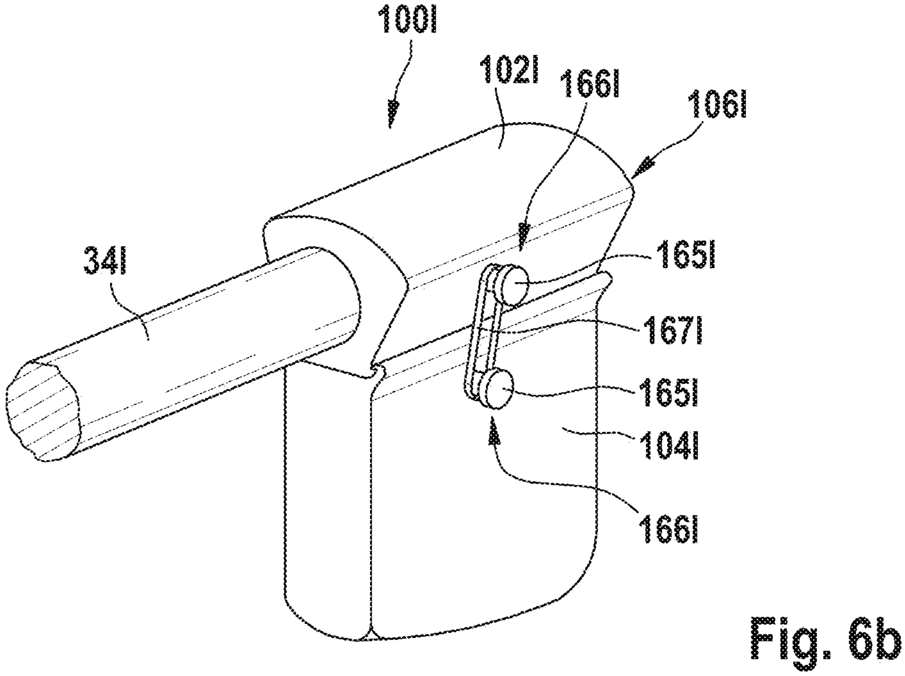
FIG. 6*b* a perspective view of a multipart suction extraction adapter of a tenth embodiment of the drilling tool.
Figure 6C:
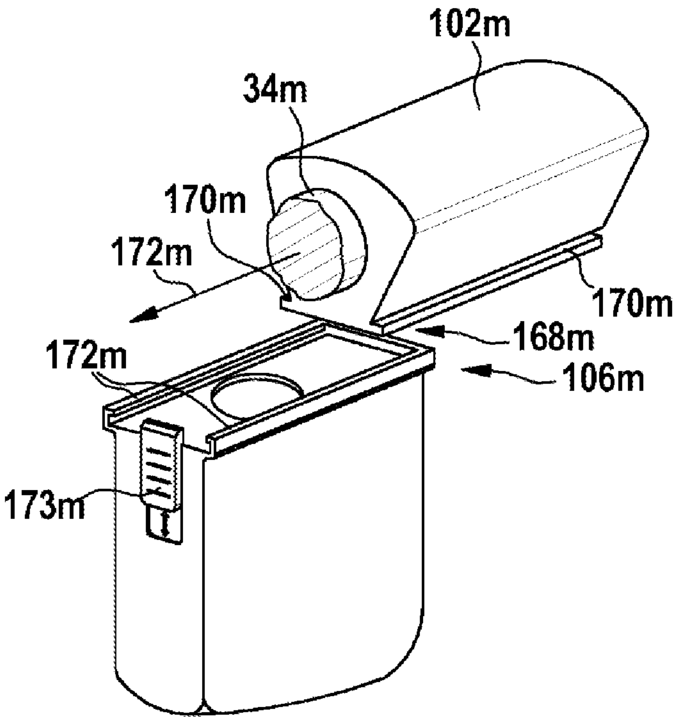
FIG. 6*c* a perspective view of a multipart suction extraction adapter of an eleventh embodiment of the drilling tool.

FIG. 6*a* to FIG. 6*c* show alternative embodiments of the multipart suction extraction adapter 100. The suction extraction adapters 100*k*, 100*l*, 100*m* in this case differ, in particular, in their housing interface 106*k*, 106*l*, 106*m*.

In the embodiment according to FIG. 6*a*, the multipart suction extraction adapter 100*k* has a first housing element 102*k* and a second housing element 104*k*, which are connected to each other via the housing interface 106*k*. The first housing element 102*k*, as already in the previous embodiments, is connected in a rotationally fixed manner to a sleeve element 34*k*, and can be connected to a main body (not represented) of a drilling tool. The housing interface 106*k* is designed to produce a hook-and-loop closure connection between the first housing element 102*k* and the second housing element 104*k*. The housing interface 106*k* has two hook-and-loop closure elements 160*k*, 161*k*, which correspond to each other and which are designed to form a hook-and-loop connection to each other. The first hook-and-loop closure element 160*k* is realized, for example, as a hook-and-loop tape having barbs, the second hook-and-loop closure element 161*k* being realized, for example, as a hook-and-loop tape having loops. The first and the second hook-and-loop closure element 160*k*, 161*k* are fastened to the second housing element 104*k*. The first hook-and-loop closure element 160*k* is fastened on a first side 162*k* of the second housing element 104*k*. The first hook-and-loop closure element 160*k* is advantageously fastened in a movable manner on the second housing element 104*k*. The second hook-and-loop closure element 161*k* is fastened on a second side 163*k* of the second housing element 104*k*. In particular, the second hook-and-loop closure element 161*k* is immovably fastened to the second housing element 104*k*. The first and the second side 162*k*, 163*k* of the housing element 104*k* are opposite each other and form outer faces of the suction extraction adapter 100*k*. To produce the connection, the first housing element 102*k* placed on the second housing element 104*k*, and the movable hook-and-loop closure element 161*k* is then wrapped around the first housing element 102*k* and connected to the immovable hook-and-loop closure element 161*k*. The first housing element 102*k* is held on the second housing element 104*k* as a result of connection of the two hook-and-loop closure elements 160*k*, 161*k*.

In the embodiment according to FIG. 6*b*, the multipart suction extraction adapter 100*l* has a first housing element 102*l* and a second housing element 104*l*, which are connected to each other via the housing interface 106*l*. The first housing element 102*l*, as already in the previous embodiments, is connected in a rotationally fixed manner to a sleeve element 34*l*, and can be connected to a main body (not represented) of a drilling tool. The housing interface 106*l* is designed to produce a force-fitting connection between the first housing element 102*l* and the second housing element 104*l*. The suction extraction adapter 100*l* has two mutually opposite sides 162*l*, 163*l*, which are each realized as outer faces. On each of the sides 162*l*, 163*l*, both the first and the second housing element 102*l*, 104*l* has a holding means 165*l*. The holding means 165*l* are, for example, identical. The holding means 165*l* extend in the manner of studs from the suction extraction adapter 100*l*. At their free end 166*l*, the holding means 165*l* have a button-type widened portion at which the diameter of the holding means 165*l* is widened. To produce the connection between the first and the second housing element 102*l*, 104*l*, a holding means 165*l* of the first housing element 102*l* and a holding means 165*l* of the second housing element 104*l* are in each case connected to each other by an elastic connection means 167*l*. The elastic connection means 167*l* may be realized, for example, as a rubber ring or rubber band. In the connected state, the elastic connection means 167*l* applies a force to the first housing element 102*l*, in the direction of the second housing element 104*l*, in such a manner that the two housing elements 102*l*, 104*l* are held on each other. The button-type widened portion at the free end 166*l* of the holding means 165*l* ensures, advantageously, that the elastic connection means 167*l* does not slip out of engagement.

In the embodiment according to FIG. 6*c*, the multipart suction extraction adapter 100*m* has a first housing element 102*m* and a second housing element 104*m*, which are connected to each other via the housing interface 106*m*. The first housing element 102*m*, as already in the previous embodiments, is connected in a rotationally fixed manner to a sleeve element 34*m*, and can be connected to a main body (not represented) of a drilling tool. In FIG. 6*c* the suction extraction adapter 100*m* is shown in a non-connected state. The housing interface 106*m* of the suction extraction adapter 100*m* has a guide unit 168*m* and a securing unit 169*m*. The guide unit 168*m* has a pair of guide rails 170*m* and a pair of guide grooves 171*m* corresponding to the guide rails 170*m*. The guide rails 170*m* are assigned, for example, to the first housing element 102*m*, and the guide grooves 171*m* are assigned, for example, to the second housing element 104*m*. Preferably, the guide rails 170*m* and the guide grooves 171*m* are realized as a single piece with the first housing element 102*m* and with the second housing element 104*m*, respectively. To produce the connection between the first housing element 102*m* and the second housing element 104*m*, the second housing element 104*m* is pushed, along a guide direction 172*m*, into the first housing element 102*m*, in particular onto the guide rails 170*m* of the first housing element 102*m*. The guide direction 172*m* is, for example, parallel to a longitudinal axis of a drilling tool (not represented. It is likewise conceivable, however, for the guide direction 172*m* to be transverse to or perpendicular to the longitudinal axis of the drilling tool. The securing unit 169*m* is designed to lock the two housing elements 102*m*, 104*m* in the connected state, and thereby secure them against separation. The securing unit 169*m* has a linearly movable operating element 173*m*, which is arranged on the second housing element 104*m*, in particular on the outer face of the second housing element 104*m*. The securing unit 169*m* advantageously has a restoring element, not represented, which applies a force to the operating element 173*m* in the direction of a locking position. The restoring element is realized, for example, as a spring. The operating element 173*m* is arranged in front of the guide grooves 171*m* in the guide direction 172*m*. After the second housing element 104*m* has been pushed on, the force applied by the restoring element causes the operating element 173*m* to move automatically upward into a locking position. In the locking position the operating element 173*m* bears end-wise against the first housing element 102*m*. Thus, in the locking position, the operating element 173*m* forms a stop that prevents the two housing elements 102*m*, 104*m* from moving relative to each other along the guide direction 172*m*. By means of a force contrary to the force of the restoring element, a user can use the operating element 173 to undo the locking and separate the two housing elements 102*m*, 104*m* from each other. Alternatively, it is also conceivable that, on its side that faces toward the second housing element 104*m*, the first housing element 102*m* has a pocket, which corresponds to the operating element 173*m* and in which the operating element 173 engages in the connected state. The operating element 173*m* is arranged, for example, on the rear side of the suction extraction adapter 100*m* that faces away from the drilling head. It is also conceivable, however, for the operating element 173*m* to be arranged on a rear side or laterally. Actuation of the operating element 173*m* is preferably effected perpendicularly in relation to the guide direction 172*m*. Alternatively, however, other actuation directions would also be conceivable, such as, for example, parallel to the guide direction 172*m*.

Figure 7A:
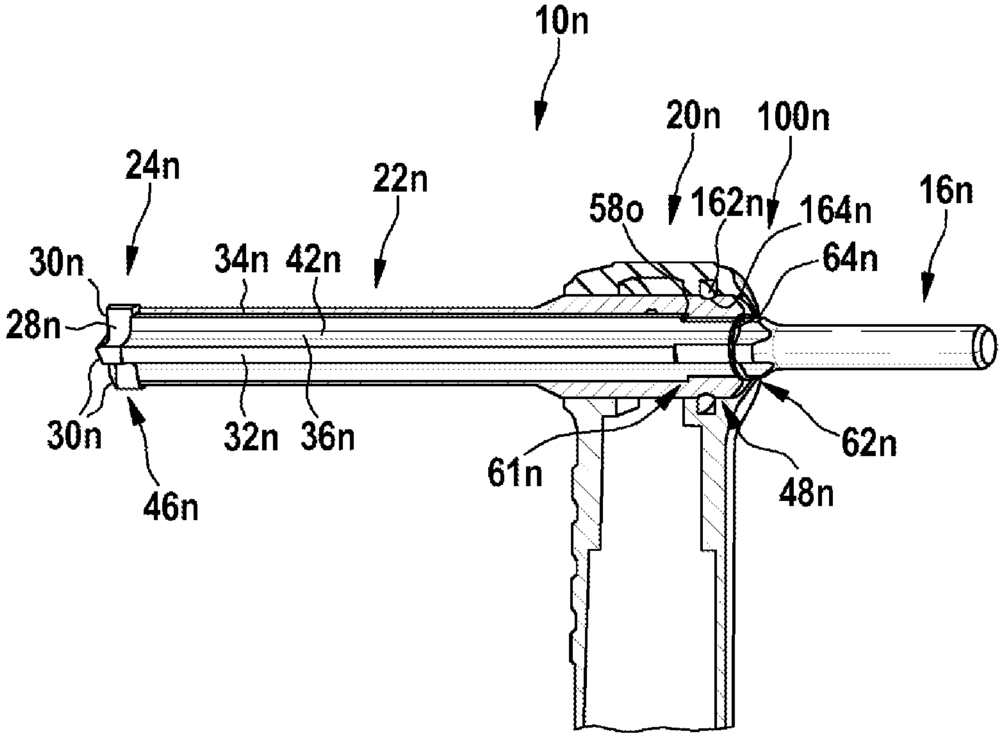
FIG. 7*a* a partial section of a twelfth embodiment of the drilling tool.
Figure 7B:
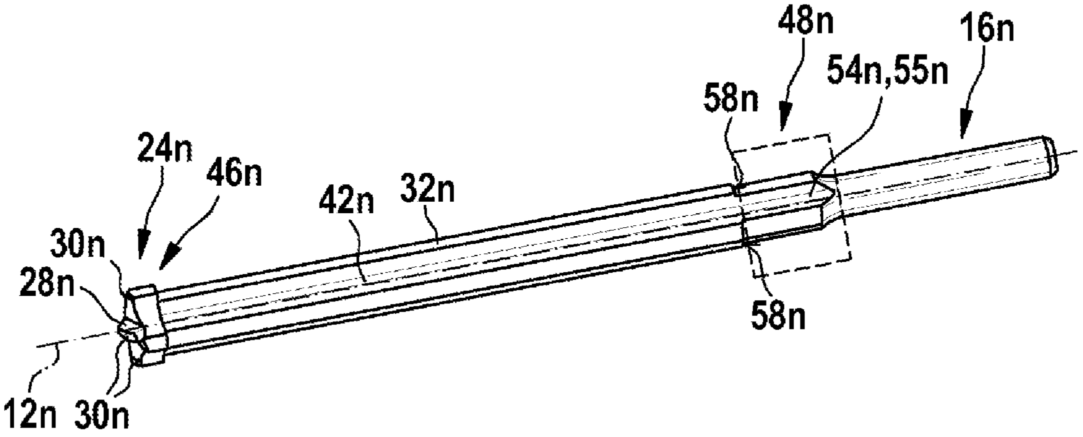
FIG. 7*b* a perspective view of a main body of the drilling tool according to FIG. 7*a;*
Figure 7C:
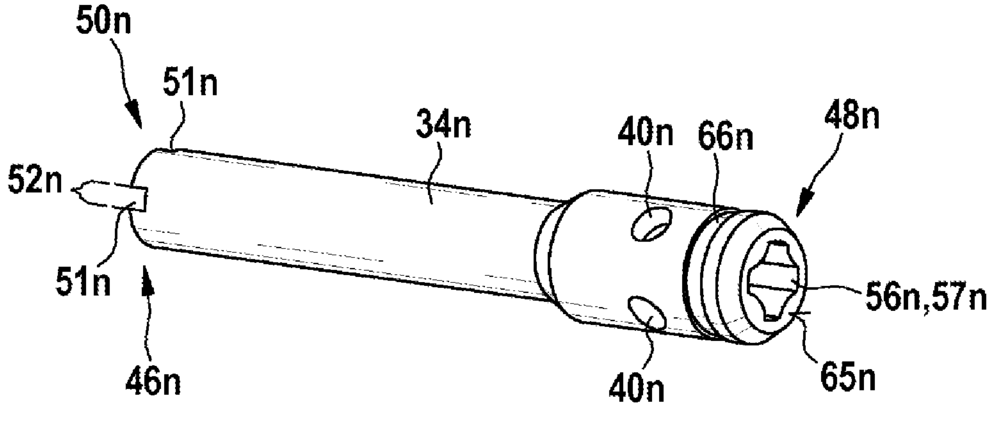
FIG. 7*c* a perspective view of a sleeve element of the drilling tool according to FIG. 7*a;*

FIG. 7*a* shows an alternative embodiment of a drilling tool 10*n*, in a partial section. The drilling tool 10*n* has an insertion end 16*n*, a function region 20*n*, a conveying region 22*n* and a drilling head 24*n*. Arranged in the conveying region 22*n*, radially between a main body 32*n* and a sleeve element 34*n*, are conveying channels 36*n* that extend, parallel to a longitudinal axis 12*n* of the drilling tool 10*n*, through the conveying region 22*n*. In particular, the conveying channels 36*n* are arranged eccentrically in relation to the longitudinal axis 12*n* of the drilling tool 10*n*, and thus do not intersect the longitudinal axis 12*n*. The main body 32*n* and the sleeve element 34*n* are shown in a perspective view in FIG. 7*b* and FIG. 7*c*. The conveying channels 36*n* are formed by grooves 42*n*, which extend rectilinearly in the main body 32*n* of the drilling tool 10*n*, and in particular eccentrically in relation to the longitudinal axis 12*n*. The grooves 42*n* begin at the end of the main body 32*n* that faces toward the drilling head 24*n*, and end in the region of the transition to the insertion end 16*n*. The drilling head 24*n* is realized as a solid carbide head, and has a single cutting body 28*n*. The cutting body 28*n* is welded onto a blunt end face of the main body 32*n* of the drilling tool 10*n*. The cutting body 28*n* comprises four cutting elements 30*n*, which extend radially outward, starting from the mid-point of the cutting body 28*n*. The cutting body 28*n* is realized as a single piece. Unlike the previous embodiments, the main body 32*n* and the sleeve element 34*n* are connected to each other in a rotationally fixed and separable manner. The insertion end 16*n* is realized as a single piece with the main body 32*n*. During operation of the drilling tool 10*n*, a drive motion is transmitted from a tool receiver 302 of a hand-held power tool 300, via the insertion end 16*n*, to the main body 32*n*. A form-fitting connection between the main body 32*n* and the sleeve element 34*n* in this case causes a torque to be transmitted, in the direction of rotation, from the main body 32*n* to the sleeve element 34*n*. The rotationally fixed connection between the main body 32*n* and the sleeve element 34*n* is effected by means of a first form-fit region 46*n* and a second form-fit region 48*n*. The first form-fit region 46*n* is arranged in the region of the drilling head 24*n*. In the first form-fit region 46, in particular, a form-fitting connection is formed between the sleeve element 34*n* and the drilling head 24*n*. At its outside end that faces toward the drilling head 24*n*, the sleeve element 34*n* has a toothing 50*n* that, in particular, is realized as an axial toothing. The toothing 50*n* is formed by axial recesses 51*n*. The axial recesses 51*n* have a width 52*n* that corresponds substantially to the width of the cutting elements 30*n* of the cutting body 28*n*. Between the recesses 51*n*, the sleeve element 34*n* projects axially, between the cutting elements 30*n*, into the drilling head 24*n*. Advantageously, the suction intake openings 38*n*, through which drilling cuttings are sucked into the conveying channels 36*n* during the drilling operation, are thus position further in the direction of the tip of the drilling head 24*n* than in the embodiment according to FIG. 1, thereby improving the take-up of the drilling cuttings during spot-drilling. The sleeve element 34*n* has an outer diameter that is smaller than an envelope curve of the drilling head, and it can thus be ensured that during drilling the cutting body 28*n* is always in contact with the material to be worked.

The second form-fit region 48*n* is arranged, for example, in the region between the conveying region 22*n* and the insertion end 16*n*. In the second form-fit region 48*n* the main body 32*n* and the sleeve element 34*n* have mutually corresponding form-fit elements 54*n*, 56*n*. The form-fit elements 54*n*, 56*n* are realized, for example, as mutually corresponding toothings 55*n*, 57*n* that are realized, in particular, as a radial toothing. The drilling cuttings sucked in via the suction intake openings 38*n* exit the conveying channels 36*n* via suction outlet openings 40*n*. The suction outlet openings 40*n* are realized as transverse bores in the sleeve element 34*n*. In the connected state, the suction outlet openings 40*n* are arranged radially outside of the grooves 42*n* in the main body 32*n*. The grooves 42*n* extend beyond the suction outlet openings 40*n* in the direction of the insertion end 16*n*, and thus form the form-fit elements 54*n* of the main body 32*n* that are realized as a toothing 55*n*. On its end that faces away from the drilling head 24*n* the sleeve element 34*n* has a corresponding toothing 57*n*, as a form-fit element 56*n*. Via the form-fit elements 54*n*, 56*n*, a torque is transmitted to the main body 32*n* to the sleeve element 34*n*. Axially, the sleeve element 34*n* is arranged on the main body 32*n*, likewise via the form-fit element 56*n* of the sleeve element 34*n* that is realized as a toothing 57*n*, between two axial bearing points 61*n*, 62*n*. The first bearing point 61*n* is arranged behind the second bearing point 62*n* in the direction of advance of the drilling tool 10*n*. The first bearing point 61*n* is formed by a stop 58*n* of the main body 32*n*, against which the form-fit element 56*n* of the sleeve element 34*n* is in bearing contact. The stop 58*n* is formed, for example, by an abrupt constriction of the diameter of the main body 32*n* in the region of the form-fit element 54*n* of the main body 32*n*. In particular, in the region in which the grooves 42*n* form the form-fit element 54*n*, the main body 32*n* has a lesser outer diameter than in the region in which the grooves 42*n* form the conveying channels 36*n*. The second bearing point 62*n* is formed by a securing ring 64*n*. The securing ring 64*n* is realized, for example, as a snap ring. In the connected state, the outside end 65*n* of the sleeve element 34*n* that faces away from the drilling head 24*n* bears against the securing ring 64*n*. Releasing the securing ring 64*n* advantageously enables the sleeve element 34*n* to be released from the main body 32*n* of the drilling tool 10*n*, in order to expose and clean the conveying channels 36*n*.

Alternatively, it is also conceivable for the rotationally fixed and separable connection of the main body 32*n* to the sleeve element 34*n* to be realized only via the first form-fit region 46*n* or only via the second form-fit region 48*n*.

In the junction region 20*n* the drilling tool 10*n* has a single-part suction extraction adapter 100*n*, which is connected to the sleeve element 34*n* via an O-ring (not represented). The O-ring is held in an inner annular groove 164*n* of the suction extraction adapter 100*n*. For the purpose of connection to the drilling tool 10*n*, the suction extraction adapter 100*n* is pushed onto the sleeve element 34*n* until the suction extraction adapter 100*n* latches-in on the sleeve element 34*n*. For this purpose, the sleeve element 34*n* has an annular groove 66*n*, which is arranged in front of the suction outlet openings 40*n* in the direction of advance.

Figure 8:
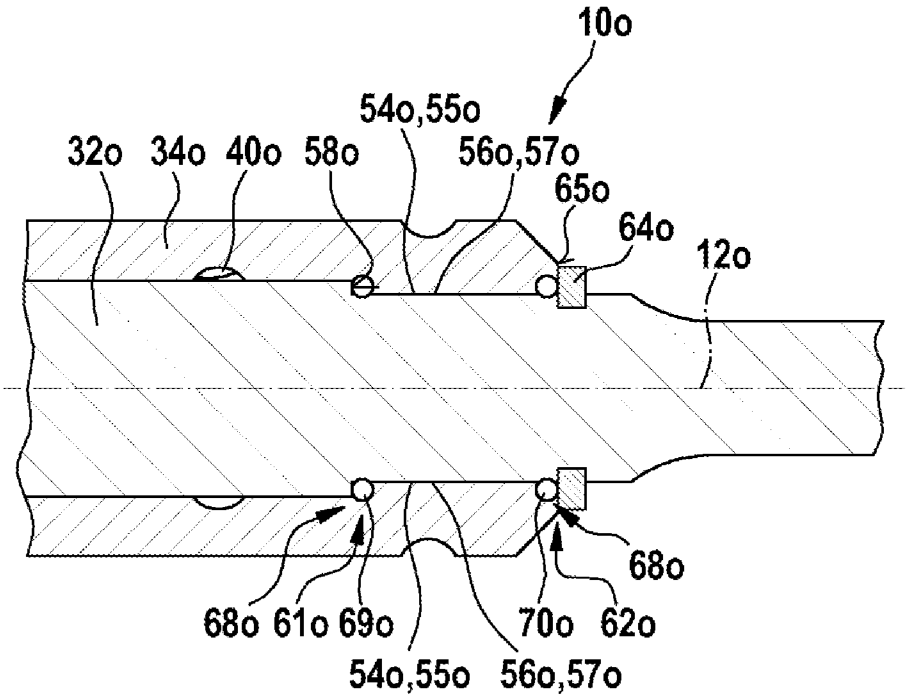
FIG. 8 a partial section of a thirteenth embodiment of the drilling tool.

FIG. 8 shows a partial longitudinal section through an alternative embodiment of the drilling tool 10*n*. The drilling tool 10*o* is substantially identical in design to the drilling tool 10*n*, but additionally has a damping unit 66*o*, which is designed to damp an impulse transmitted from the main body 32*o* to the sleeve element 34*o*. It is thereby possible, advantageously, to significantly reduce the wear on drilling tools in which the sleeve element is not connected in a materially bonded manner to the main body. The drilling tool 10*o* according to FIG. 8 has a second form-fit region 48*o*, via which the sleeve element 34*o* is connected to the main body 32*o*. As already described, the second form-fit region 48*o* has a form-fit element 54*o*, realized as a toothing 55*o*, which is assigned to the main body 32*o*, and has a form-fit element 56*o*, realized as a toothing 57*o*, which is assigned to the sleeve element 34*o*. The drilling tool 10*o* additionally has a first and a second axial bearing point 61*o*, 62*o*.

The first bearing point 61*o* is arranged behind the second bearing point 62*o* in the direction of advance of the drilling tool 10*o*. The first bearing point 61*o* is formed by a stop 58*o* of the main body 32*o*. The stop 58*o* is formed by an abrupt constriction of the diameter of the main body 32*o* in the region of the form-fit element 54*o* of the main body 32*o*. In particular, in the region in which the grooves 42*o* form the form-fit element 54*o*, the main body 32*o* has a lesser outer diameter than in the region in which the grooves 42*o* form the conveying channels 36*o*. The second bearing point 62*o* is formed by a securing ring 64*o*. The securing ring 64*o* is realized, for example, as a snap ring. The damping unit 66*o* comprises at least one damping element 69*o*. For example, the damping unit 66*o* comprises two damping elements 69*o*,70*o*. The damping unit 66*o* is arranged, in particular, in the region of the axial bearing points 61*o*,62*o*, a first damping element 69*o* being assigned to the first bearing point 61*o*, and the second damping element 70*o* being assigned to the second bearing point 62*o*. Preferably, the damping unit 66*o* comprises at least one damping element 69*o* for each axial bearing point 61*o*,62*o*. The damping elements 69*o*,70*o* are elastic, in particular realized as rubber rings, or O-rings.

In the region of the first axial bearing point 61*o*, the first damping element 69*o*, realized as a rubber ring, is arranged concentrically in relation to a longitudinal axis 12*o* of the drilling tool 10*o*. The first damping element 69*o* is arranged in such a manner that the sleeve element 34*o* bears axially against the main body 32*o*, in particular in the direction of advance, via the first damping element 69*o*. In particular, the damping element 69*o* is arranged in such a manner that the form-fit element 56*o* of the sleeve element 34*o*, realized as a toothing 57*o*, does not bear axially directly against the stop 58*o* of the main body 32*o*, but via the first damping element 69*o*. In the region of the second axial bearing point 62*o*, the second damping element 70*o*, realized as a rubber ring, is arranged concentrically in relation to the longitudinal axis 12*o* of the drilling tool 10*o*. The second damping element 70*o* is arranged in such a manner that the sleeve element 34*o* does not bear axially directly against the securing ring 64*o*, in particular contrary to the direction of advance, but via the second damping element 70*o*. In particular, the second damping element 70*o* is arranged in such a manner that the form-fit element 56*o* of the sleeve element 34*o*, realized as a toothing, bears axially, via the second damping element 70*o*, against the stop 58*o* of the main body 32*o*. Alternatively, it is likewise conceivable for an outside end 65*o* of the sleeve element 34*o* that faces away from the drilling head (not represented) to bear axially against the securing ring 64*o* via the second damping element 70*o*. The damping elements 69*o*,70*o* realized as rubber rings may be arranged loosely on the main body 32*o*. Alternatively, it is also conceivable for the damping elements 69*o*,70*o* realized as rubber rings to be under tension on the main body 32*o*, such that thy are fastened on the main body 32*o* in a force-fitting manner.

Figure 9:
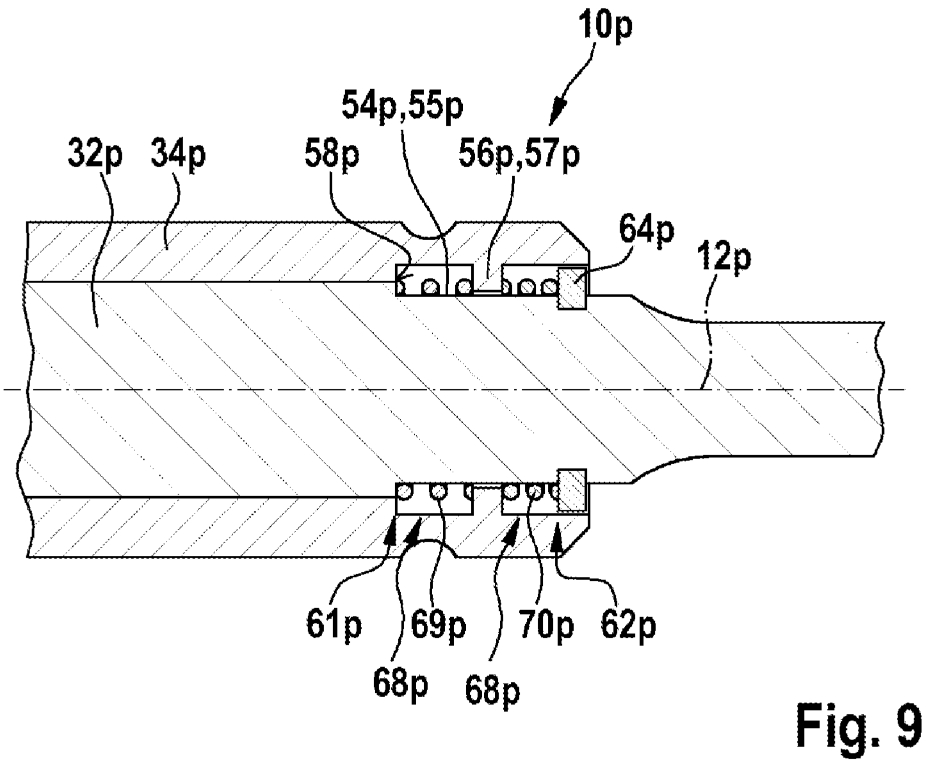
FIG. 9 a partial section of a fourteenth embodiment of the drilling tool.
Figure 10:
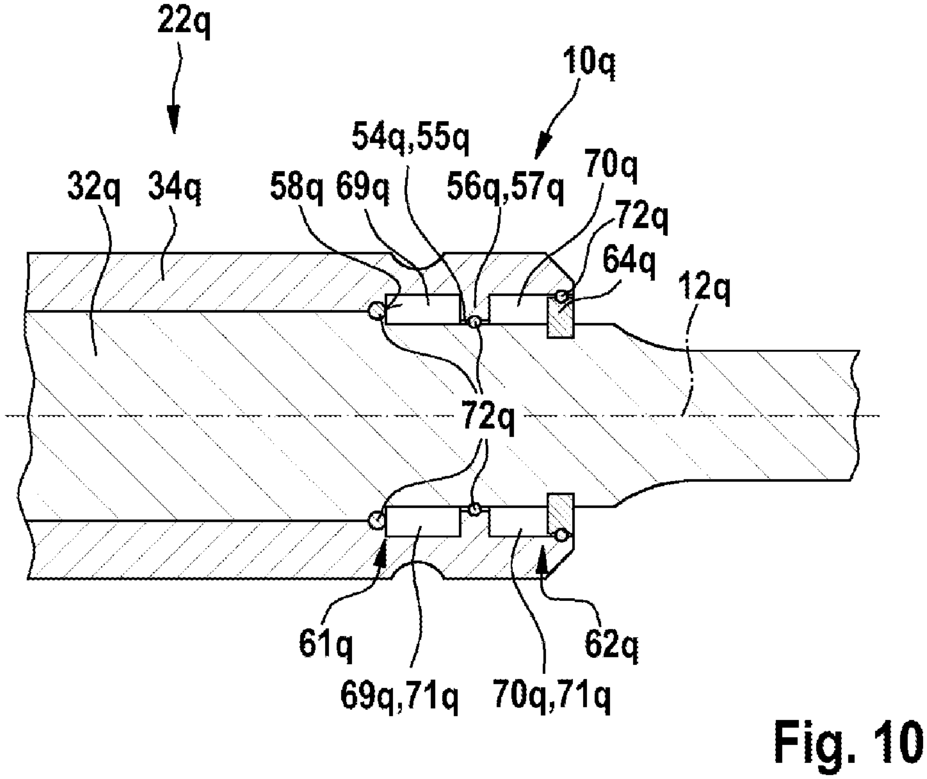
FIG. 10 a partial section of a fifteenth embodiment of the drilling tool.

FIG. 9 and FIG. 10 show two alternative embodiments of the damping unit 66*o* according to FIG. 8. The drilling tool 10*p* according to FIG. 9 and the drilling tool 10*q* according to FIG. 10 in this case are substantially identical in design to the drilling tool 10*o* according to FIG. 8, and differ in the design of the damping units 68*p*, 68*q*.

The damping unit 66*p* according to FIG. 9 has two damping elements 69*p*,70*p*, which are realized as spring elements. The spring elements are realized as, in particular, metallic annular springs. The damping elements 69*p*,70*p* realized as spring elements bear axially against two mutually opposites of the form-fit element 56*p* of the sleeve element 34*p*, and damp an impulse upon the sleeve element 34*p* that emanates from the main body 32*p* when the drilling tool 10*p* is in operation.

The damping unit 66*q* according to FIG. 10 has two damping elements 69*q*, 70*q*, which are realized as gas-spring elements. The gas-spring elements are realized, for example, as air springs. The damping elements 69*q*, 70*q* realized as gas-spring elements bear axially on two mutually opposite sides of the form-fit element 56*q* of the sleeve element 34*q*, and damp an impulse upon the sleeve element 34*q* that emanates from the main body 32*q* when the drilling tool 10*q* is in operation. The gas-spring elements are formed, in particular, by a sealed cavity 71*q* between the sleeve element 34*q* and the main body 32*q*. In particular, the cavity 71*q* is sealed in such a manner that the pressure of the air within the cavity 71*q* changes as a result of a relative movement of the main body 32*q* relative to the sleeve element 34*q*, in particular in the case of a linearly oscillating motion of the main body 32*q*. Preferably, the damping elements 69*q*, 70*q* are realized in such a manner that the sleeve element 34*q* does not bear against the main body 32*q* during operation, thereby minimizing wear. Owing to the change of pressure, or the compression of the air in the cavity 71*q*, the impulse is advantageously transmitted in a damped manner to the sleeve element 34*q*. In order to optimize the sealing of the cavity 71*q*, the drilling tool 10*q* has sealing elements 72*q* that are arranged radially between the sleeve element 34*q* and the main body 32*q*. The sealing elements 72*q* are realized, for example, as rubber rings. The drilling tool 10*q* has, for example, three sealing elements 72*q*. The first sealing element 72*q* is arranged in the region of the first axial bearing point 61*q*, in particular in the region of the main body 32*q*, in which the grooves (not represented) of the main body 32*q* form the conveying region 22*q*. The second sealing element 72*q* is arranged in the second form-fit region 48*q*, in particular between the form-fit elements 54*q*,56*q*. The third sealing element 72*q* is arranged in the region of the second axial bearing point 62*q*, in particular between the securing ring 64*q* and the sleeve element 34*q*. Advantageously, owing to the sealing elements 72*q*, the effectiveness of the damping elements 69*q*,70*q* realized as gas-spring elements can be improved.

Figure 11A:
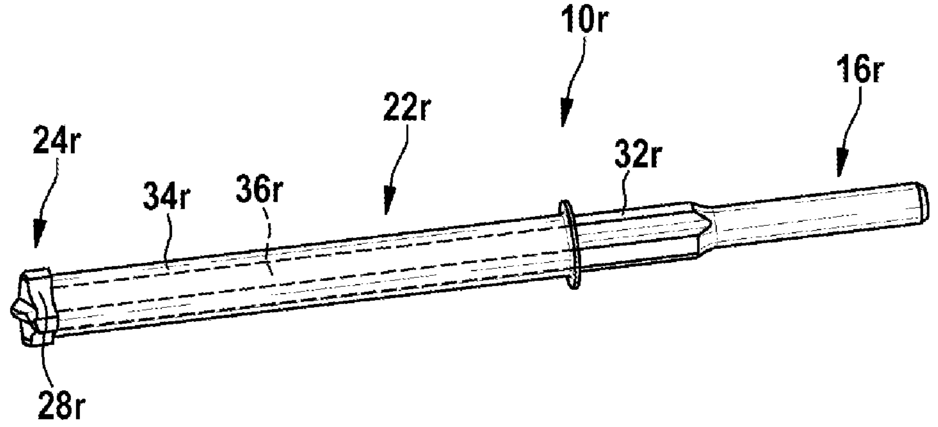
FIG. 11*a* a perspective view of a sixteenth embodiment of the drilling tool.
Figure 11B:
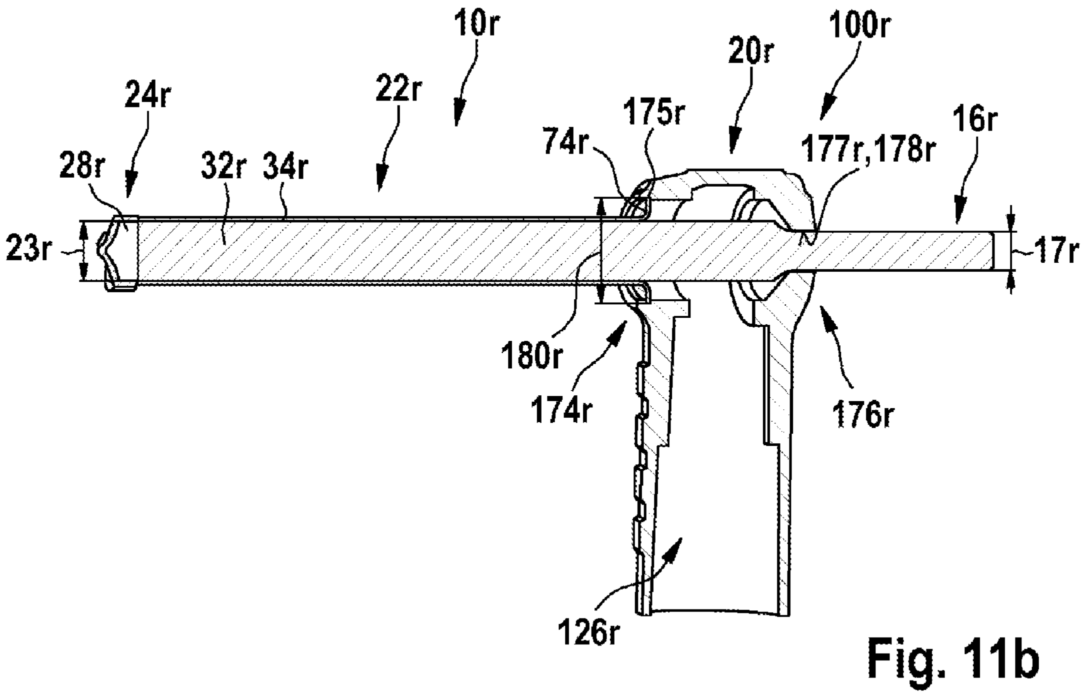
FIG. 11*b* a longitudinal section of a first drilling tool according to the embodiment of FIG. 11*a;*
Figure 11C:
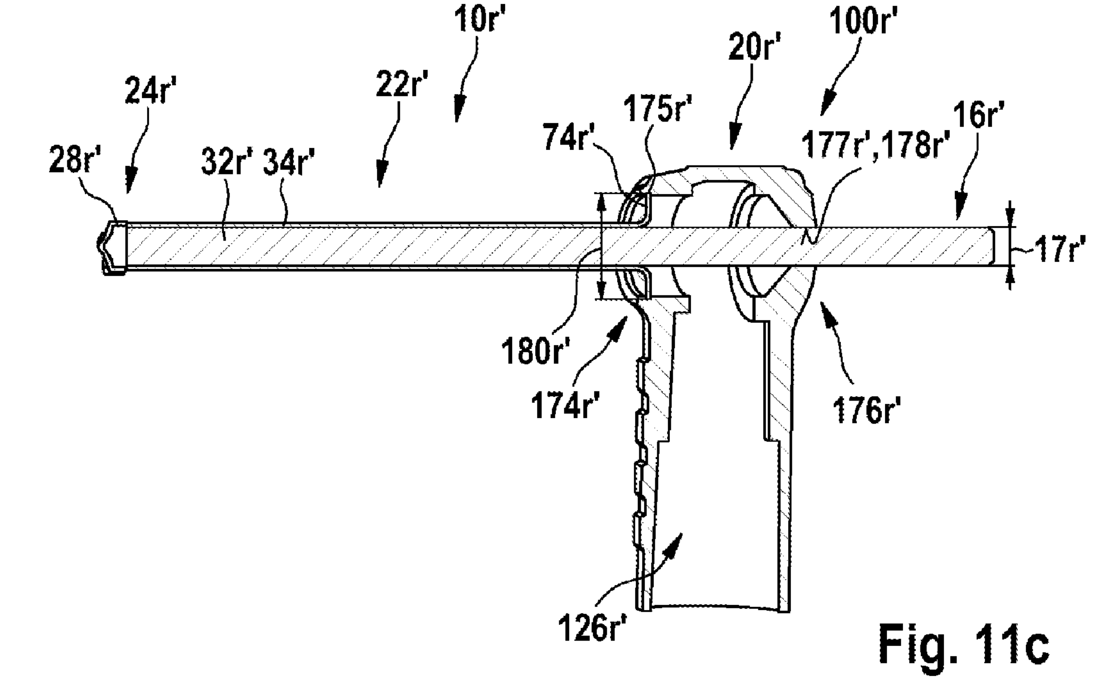
FIG. 11*c* a longitudinal section of a second drilling tool according to the embodiment of FIG. 11*a;*

FIG. 11*a* to FIG. 11*c* show a system composed for a first drilling tool 10*r* and a second drilling tool 10*r*', the drilling tool 10*r*, 10*r*' being designed to drill holes of differing sizes and to be connectable to the same suction extraction adapter 100*r*.

FIG. 11*a* shows a perspective view of the first drilling tool 10*r* which, along its longitudinal axis 12*r*, has an insertion end 16*r*, a conveying region 22*r* and a drilling head 24*r*. The drilling tool 10*r* has a main body 32*r*, which forms the insertion end 16*r* and which extends from the insertion end 16*r* to the drilling head 24*r*. On its outer surface the main body 32*r* has grooves 42*r*, which extend rectilinearly, beginning from the end that faces toward the drilling head 24*r*, in the direction of the insertion end 16*r*. The drilling head 24*r* has a cutting body 28*r*, which is connected in a materially bonded manner, by means of a welding process, to the main body 32*r* on a blunt joint face arranged at an outside end thereof. In the conveying region 22*r* the drilling tool 10*r* has a sleeve element 34*r*, which is connected, for example in a materially bonded manner, to the main body. The materially bonded connection may be effected, for example, by means of a welded joint or a soldered joint. The sleeve element 34*r* is connected in a rotationally fixed manner to the main body 32*r*. Alternatively, it would also be conceivable for the connection to be effected in a force-fitting and/or form-fitting manner, and/or for the sleeve element 34*r* to be rotatably mounted on the main body 32*r*. The sleeve element 34*r* closes off the grooves 42*r* of the main body 32*r* in such a manner that closed conveying channels 36*r* are formed in the conveying region 22*r*.

The drilling tool 10*r* is separably connected to a suction extraction adapter 100*r*. FIG. 11*b* shows a longitudinal section through the first drilling tool 10*r* and through the suction extraction adapter 100*r* in the connected state. The suction extraction adapter 100*r* is realized, for example, as a single part. The suction extraction adapter 100*r* has a housing interface 106*r* realized, for example, as an in particular conically shaped cavity, and which is designed for connection to a suction hose 402 of a suction extraction device 400. It is likewise conceivable, however, for the suction extraction adapter 100*r* to be of a multipart design, as described previously. The insertion end 16*r* has an outer diameter 17*r* that differs from an outer diameter 23*r* of the conveying region 22*r*. In particular, the outer diameter 23*r* of the conveying region 22*r* is greater than the outer diameter 17*r* of the insertion end 16*r*. The outer diameter 17*r* of the insertion end is usually standardized, such as, for example, an outer diameter of 10 mm in the case of an SDS-plus drill-bit shank, or an outer diameter of 18 mm in the case of an SDS-max drill-bit shank. An outer diameter 23*r* of the conveying region 22*r* is to be understood to mean, in particular, a diameter of the main body 32*r* in the region in which the conveying channel 36*r* is closed. The suction extraction adapter 100*r* is arranged in a junction region 20*r* in which the conveying region 22*r* and the insertion end 16*r* overlap. In the junction region 20*r* the suction extraction adapter 100*r* has a first coupling region 174*r* and a second coupling region 176*r*, the first coupling region 174*r* coinciding with the conveying region 22*r*, and the second coupling region 176*r* coinciding with the insertion end 16*r*. In particular, the first coupling region 174*r* is arranged in the region of an opening of the suction extraction adapter 100*r* that faces toward the drilling head 24*r*, and the second coupling region 176*r* is arranged in the region of an opening of the suction extraction adapter 100*r* that faces toward the insertion end 16*r*. In the coupling regions 174*r*, 176*r* the suction extraction adapter 100*r* is connected to the main body 32*r* and/or to the sleeve element 34*r*, in particular connected in a force-fitting and/or form-fitting manner.

In the first coupling region 174*r* the suction extraction adapter 100*r* is connected in a form-fitting manner to the drilling tool 10*r*, in particular to the sleeve element 34*r* of the drilling tool 10*r*. For this purpose, the suction extraction adapter 100*r* has, for example in the first coupling region 174*r*, a connection element 175*r* realized as a groove, in particular as an inner annular groove. The sleeve element 34*r* has a connection element 74*r* that corresponds to the connection element 1754 of the first coupling region 174*r*. The connection element 74*r* is realized, for example, as a single piece with the sleeve element 34*r*. Preferably, the sleeve element 34*r* is bent at its end that faces away from the drilling head 24*r*, such that the connection element 74*r* of the sleeve element 34*r* is realized as a collar. The collar in this case extends radially outward. The suction extraction adapter 100*r* is made from an elastic material and, for the purpose of connecting the suction extraction adapter 100*r* to the drilling tool 10*r*, is pushed onto the drilling tool 10*r* via the insertion end 16*r*. In the first coupling region 174*r* the suction extraction adapter 100*r* is formed elastically in such a manner that in the first coupling region 174*r* the suction extraction adapter 100*r* is first slightly deformed, or widened, until the connection element 74*r*, realized as a collar, latches into the connection element 175*r* realized as a groove, and a form-fitting connection is thus produced. IN the first coupling region 174*r* the drilling tool 10*r* has a coupling diameter 180*r*. The coupling diameter 180*r* in this case corresponds to an outer diameter of the connection element 74*r* of the drilling tool 10*r*. The coupling diameter 180*r* is greater than the outer diameter 23*r* of the conveying region 22*r*.

In the second coupling region 176*r* the drilling tool 10*r* has a further connection element 177*r*. The connection element 177*r* is realized as a bearing surface, which has the shape, for example, of a hollow cylinder. The hollow-cylinder bearing surface 178*r* has an inner radius that corresponds substantially to the outer radius 17*r* of the insertion end 16*r*. When the drilling tool 10*r* is in operation, the drilling tool 10*r* executes a rotating and/or linearly oscillating motion relative to the suction extraction adapter 100*r*. The first and the second connection element 175*r*, 177*r* thus also form, in particular, a sliding-contact bearing in which the drilling tool 10*r* is mounted.

FIG. 11*c* shows the second drilling tool 10*r*' in a longitudinal section. The second drilling tool 10*r*' has substantially the same structural features as the first drilling tool 10*r*, but differs in its dimensions. In particular, the dimensions of the second drilling tool 10*r*' are configured in such a manner that the second drilling tool 10*r*' is designed for drilling smaller holes than the first drilling tool 10*r*. In particular, the conveying region 22*r*' has a lesser outer diameter 23*r*' and a lesser diameter of the drilling head 24*r*' than the drilling tool 10*r*'. For example, the outer diameter 23*r*' of the conveying region 22*r*' of the second drilling tool 10*r*' corresponds substantially to the outer diameter 17*r*' of the insertion end 16*r*' of the second drilling tool 10*r*'. The second drilling tool 10*r*' can be connected to the same suction extraction adapter 100*r* as the first drilling tool 10*r*. Since the insertion end 16*r*' is standardized, there is no need for adaptation of the drilling tool 10*r*', in particular of the main body 32*r*', in the second coupling region 176*r*'. The second connection element 74*r*' is likewise realized as a collar that extends radially outward. The second connection element 74*r*' is advantageously shaped in such a manner that the coupling diameter 180*r*' of the second drilling tool 10*r*' that is formed by the second connection element 74*r*' corresponds substantially to the coupling diameter 180*r* of the first drilling tool 10*r*. In particular, a difference between the coupling diameter 180*r* and the outer diameter 23*r* of the conveying region 22*r* in the case of the first drilling tool 10*r* is less than in the case of the second drilling tool 10*r*'. It can thereby be ensured that the suction extraction adapter 100*r* can be connected both to the first drilling tool 10*r* and to the second drilling tool 10*r*'.

Figure 12:
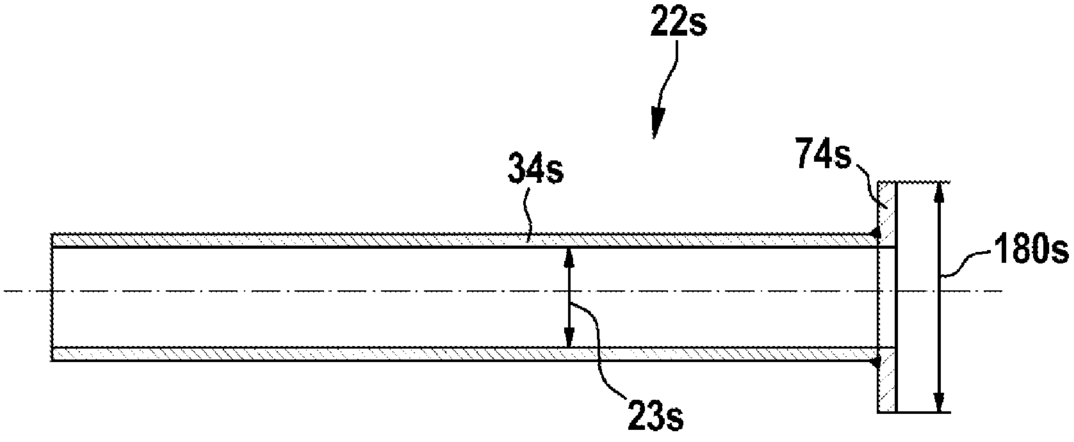
FIG. 12 a longitudinal section of an alternative embodiment of the sleeve element according to FIG. 11*a;*

FIG. 12 shows an alternative embodiment of the sleeve element 34*r* according to FIG. 11. The sleeve element 34*s* is connected in a materially bonded manner to a connection element 74*s* realized as a hollow disk. The materially bonded connection may be effected, for example, by adhesive bonding, soldering or welding. The connection element 74*s* is arranged at the outside end of the sleeve element 34*s*. Alternatively, it is also conceivable for the connection element 74*s* to be arranged on the outer face of the sleeve element 34*s*. The connection element 74*s* extends beyond the sleeve element 34*s* in the radial direction. The connection element 74*s* connected to the sleeve element 34*s* has a coupling diameter 180*s* that is greater than an outer diameter 23*s* of a conveying region 22*s*.

Figure 13:
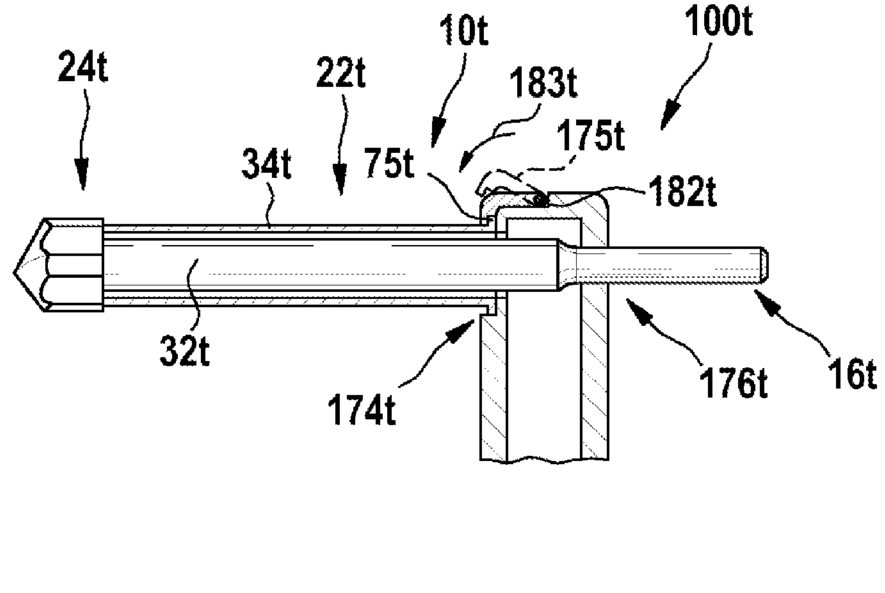
FIG. 13 a longitudinal section of an alternative embodiment of the suction extraction adapter.

FIG. 13 shows a longitudinal section of an alternative embodiment of the suction extraction adapter 100*r* according to FIG. 11. The suction extraction adapter 100*t* is connected, for example, to a drilling tool 10*r* according to FIG. 11. The suction extraction adapter 100*t* has a first coupling region 174*t* and a second coupling region 176*t*. In the first coupling region 174*t* the suction extraction adapter 100*t* has a movably mounted connection element 175*t*, in particular mounted so as to be rotatable about a rotation axis 182*t*. The connection element 175*t* is realized in the form of a hook, and in the connected state the connection element 175*t* and the connection element 74*r* of the drilling tool 10*r*, which is realized as a collar, form a form-fitting connection. To undo the form-fitting connection, the hook-shaped connection element 175*t* is rotated about the rotation axis 182*t*. Advantageously, a force is applied to the rotatably mounted connection element 175*t*, in the connection direction 183*t*, by a spring, not represented. The second coupling region 176*t* corresponds substantially to the second coupling region 176*r* according to FIG. 11. In this embodiment, advantageously, the suction extraction adapter 100*t* may be produced from a less elastic, and thus more stable, plastic.

Figure 14A:
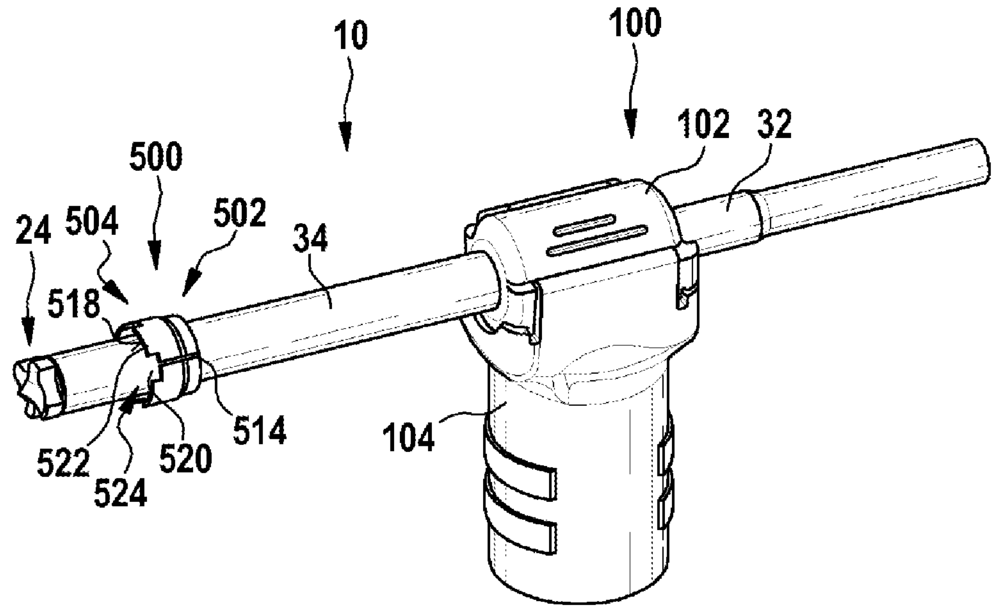
FIG. 14*a* a perspective view of a drilling tool with an auxiliary spot-drilling suction extraction device.

FIG. 14*a* shows a perspective view of an auxiliary spot-drilling suction extraction device 500 connected to a drilling tool 10 according to FIG. 1. The auxiliary spot-drilling suction extraction device 500 is realized as a single part, and is made from a plastic. The auxiliary spot-drilling suction extraction device 500 is connected in an axially movable manner to the drilling tool 10. The auxiliary spot-drilling suction extraction device 500 encompasses the drilling tool 10, preferably completely. Along its longitudinal extent, which corresponds to the longitudinal axis 12 of the drilling tool 10, the auxiliary spot-drilling suction extraction device 500 has a fastening portion 502, via which the auxiliary spot-drilling suction extraction device 500 is mounted on the drilling tool 10, and a suction extraction portion 504, which is designed to encompass the drilling head 24 of the drilling tool 10 during spot-drilling.

The fastening portion 502 is arranged on the side of the auxiliary spot-drilling suction extraction device 500 that faces away from the drilling head 24. The fastening portion 502 has a circular cross section. The fastening portion 502 has an inner diameter 506 that corresponds substantially to the outer diameter of the sleeve element 34 of the drilling tool 10. Alternatively, it is also conceivable for the inner diameter 506 to be adapted to the diameter of the drilling head 24, in order to connect the auxiliary spot-drilling suction extraction device 500 to the drilling tool 10 via the drilling head 24. In the connected state, the fastening portion 502 bears against the drilling tool 10, in particular against the sleeve element 34 of the drilling tool 10, via a bearing contact surface 510. Preferably, the fastening portion of the auxiliary spot-drilling suction extraction device 500 is realized in such a manner that, in order for the auxiliary spot-drilling suction extraction device 500 to be moved axially, at least a slight force-fitting connection, for example due to a frictional force between the auxiliary spot-drilling suction extraction device 500 and the drilling tool 10, must be overcome. Alternatively, it would also be conceivable for an additional O-ring to be mounted between the auxiliary spot-drilling suction extraction device 500 and the suction extraction adapter 100. The magnitude of the force required to move the auxiliary spot-drilling suction extraction device 500 axially may be influenced, for example, the choice of material of the auxiliary spot-drilling suction extraction device 500 and of the sleeve element 34, and/or by surface structuring and/or surface coatings.

The suction extraction portion 504 is arranged on the side of the drilling tool 10 that faces toward the drilling head 24. The suction extraction portion 504 likewise has a cylindrical cross section. The suction extraction portion 504 has an inner diameter 512 that is greater than the inner diameter 506 of the fastening portion 502. Advantageously, the inner diameter 512 of the suction extraction portion 504 is greater than the diameter of the drilling head 24, so that the fastening portion 504 can encompass the drilling head 24 during spot-drilling. Preferably, the fastening portion 502 merges, via a widened portion of the inner diameter 506, into the suction extraction portion 504. The auxiliary spot-drilling suction extraction device 500, when having been connected to the drilling tool 10, can be shifted parallel to the longitudinal axis 12 of the drilling tool 10 in such a manner that the auxiliary spot-drilling suction extraction device 500 is arranged either fully in the conveying region 22 (see FIG. 14*a*) or partially in the conveying region 22 and region of the drilling head 24 (see FIG. 14*b*). On its end face 518 the fastening portion 504 has air intake openings 520, via which air can be drawn in during drilling, and stop elements 522, which bear against a workpiece 14 during spot-drilling. The air intake openings 520 and the stop elements 522 are realized as part of a toothing 524. The toothing 524 is realized, in particular, as an axial toothing. The auxiliary spot-drilling suction extraction device 500 has an equal number of air intake openings 520 and stop element 522, for example four intake openings 520 and four stop elements 522. In the circumferential direction the air intake openings 520 and the stop elements 522 are of the same length. Differing lengths are also conceivable, however, in order to adapt the suction extraction result according to the requirement.

For the purpose of connecting the auxiliary spot-drilling suction extraction device 500 to the drilling tool 10, the auxiliary spot-drilling suction extraction device 500 has a slot 514 that extends parallel to the longitudinal extent of the auxiliary spot-drilling suction extraction device 500. The slot 514 is, in particular, continuous.

The auxiliary spot-drilling suction extraction device 500 is made from a material of such elasticity that a user can manually spread the slot 514 in such a manner that the slot is larger, or wider, than the drilling tool 10 in the conveying region 22, in particular larger, or wider, than the inner diameter 506 of the fastening portion 502.

Figure 14B:
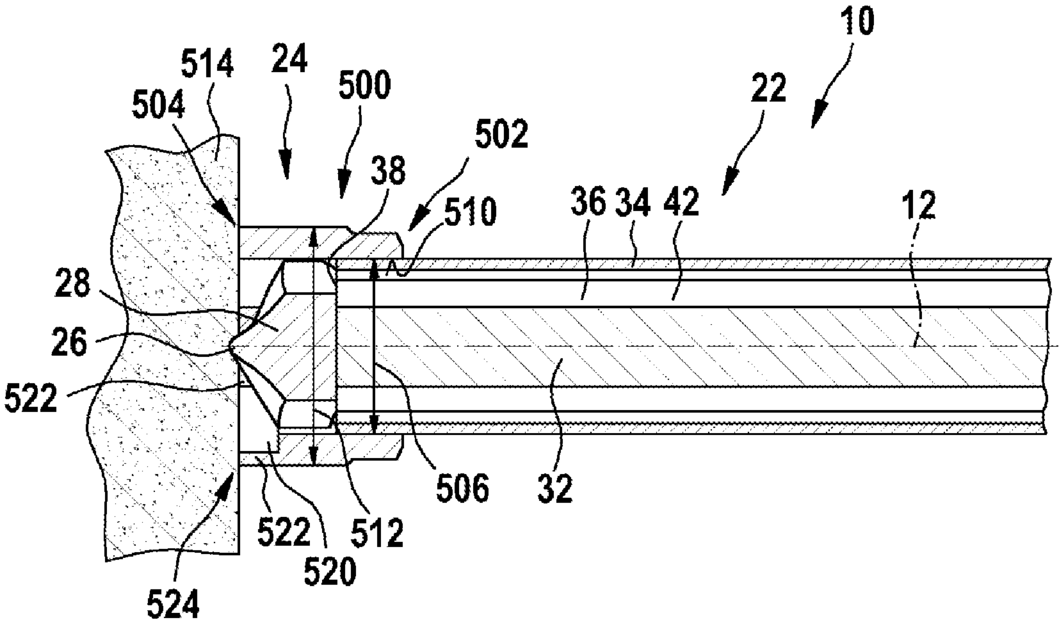
FIG. 14*b* a longitudinal section of the auxiliary spot-drilling suction extraction device according to FIG. 14*a;*

FIG. 14*b* shows a longitudinal section through the drilling tool 10 and through the auxiliary spot-drilling suction extraction device 500 during spot-drilling. The tip 26 of the drilling head 24 bears against the workpiece 14, and the auxiliary spot-drilling suction extraction device 500 has been pushed forward until the suction extraction portion 504 encompasses the drilling head 24, and in particular the suction extraction portion 504 bears against the workpiece 14. During spot-drilling, air can be drawn in, via the air intake openings 520, in the direction of the air intake openings 38 of the drilling tool 10, and at the same time the region that is covered by the stop elements 522 prevents drilling cuttings and dust, released during the spot-drilling operation, from exiting the internal space spanned by the suction extraction portion 504. In particular, the drilling cuttings are routed, via the space covered by the stop elements 522, to the suction intake openings 38 of the drilling tool 10.

Figure 15:
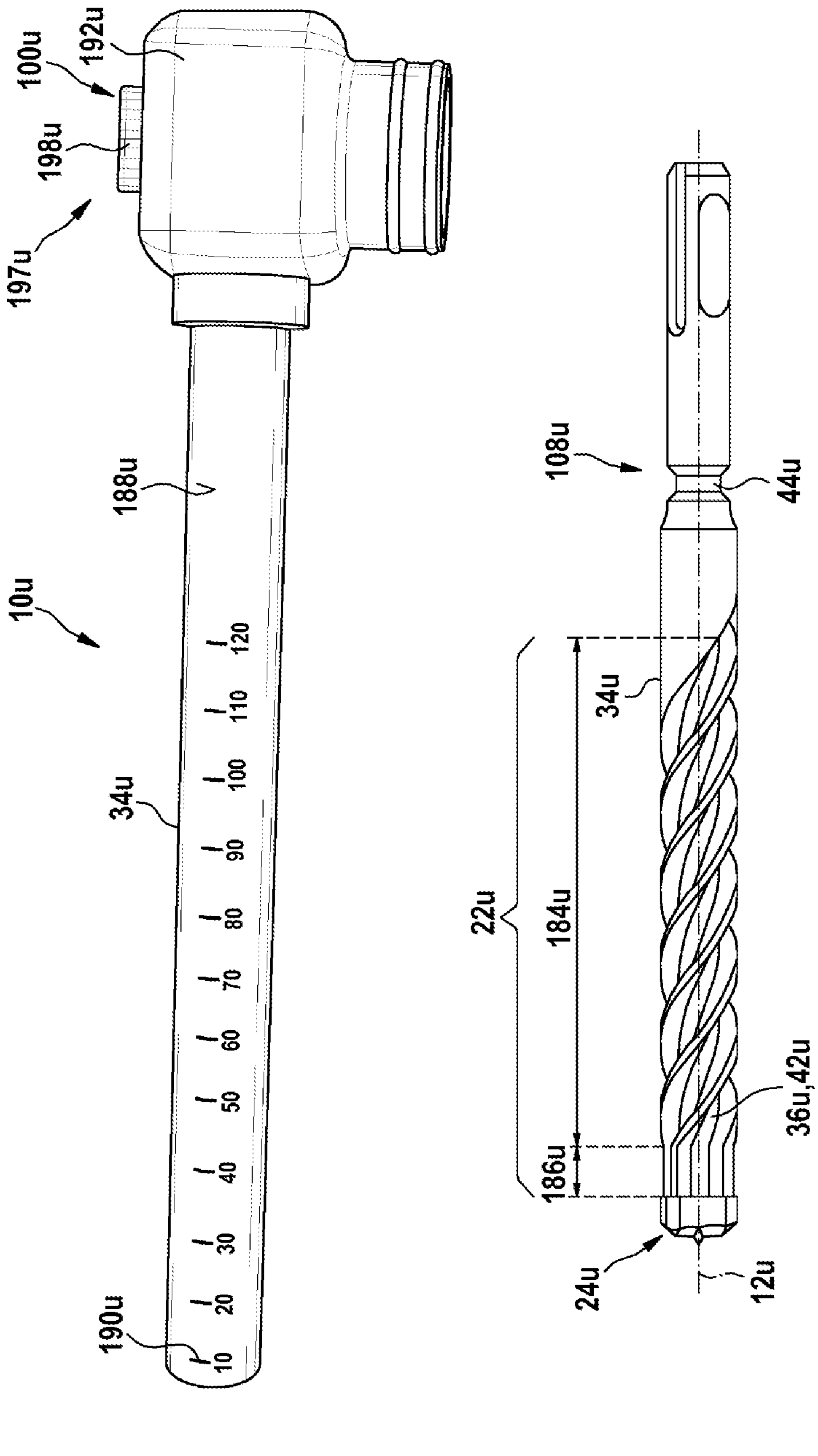
FIG. 15 a side view of a sixteenth embodiment of the drilling tool.

FIG. 15 shows a further embodiment of the drilling tool 10 according to FIG. 2*a*. The drilling tool 10*u* has a main body 32*u*, a sleeve element 34*u* and a suction extraction adapter 100*u*. The sleeve element 34*u* is connected in a materially bonded manner to the suction extraction adapter 100*u*, for example by means of an adhesive joint. The sleeve element 34*u* and the suction extraction adapter 100*u* are thus realized as a single part.

The drilling tool 10*u* is shown in the demounted state. In the mounted state, the sleeve element 34*u* encompasses the main body 32*u* in the conveying region 22*u*. In the mounted state, the main body 32*u* is rotatably connected to the sleeve element 34*u*. The main body 32*u* has four outer grooves 42*u* which, in the mounted state, form the conveying channels 36*u*. The grooves 42*u* have a first region 184*u* and a second region 186*u*, in which the shape and/or the course of the grooves 42*u* changes. The first region 184*u* is arranged in front of the second region 186*u* in the direction of advance of the drilling tool 10*u*. The first region 184*u* is arranged at an end of the grooves 42*u* that faces away from the drilling head 24*u*. In the first region 184*u* the grooves 42*u* extend helically along the longitudinal axis 12*u* of the drilling tool 10*u*. For example, a pitch of the helical grooves 42*u* in the first region 184*u* is substantially constant. Alternatively or additionally, however, it is also conceivable for the pitch of the helical grooves 42*u* in the first region 184*u* to increase or decrease, at least partially. In the second region 186*u* the grooves 42*u* extend substantially rectilinearly, parallel to the longitudinal axis 12*u*. The transition between the first region 184*u* and the second region 186*u* is, for example, abrupt, the pitch of the grooves 42*u* falling abruptly to 0°. Alternatively, it would also be conceivable for the pitch of the grooves 42*u* in the transition region to decrease steadily in the first region 184*u* to 0°, or to the pitch in the second region 186*u*.

Furthermore, the cross-sectional area of the grooves 42*u* in the first region 184*u* is greater than the cross-sectional areas of the grooves 42*u* in the section region 186*u*. This advantageously enables a high degree of mechanical stability to be realized in the region of the drilling head 24*u*. In particular, the enlargement of the cross-sectional areas of the grooves 42*u* in the first region 184*u* is realized by widening of the grooves 42*u* and/or a greater depth of the grooves 42*u*. In particular, the main body 32*u* in the first region 184*u* of the grooves 42*u* has a lesser core diameter than in the second region 186*u* of the grooves 42*u*, as a result of which the elasticity of the drilling tool 10*u* is advantageously increased, as a result of which, in turn, cushioning of the load on the drilling tool 10*u* is realized in a connection region between the main body 32*u* and the drilling tool 10*u*. Advantageously, the service life of the drilling tool 10*u* can thus be prolonged.

The sleeve element 34*u* is composed, for example, of a single layer, made from a carbon-fiber reinforced plastic. A wall thickness of the sleeve element 34*u* in this case corresponds substantially to 5% of a diameter of the drilling head 24*u*. The sleeve element 34*u* has a scale 190*u*. The scale 190*u* is arranged on an outer face 188*u* of the sleeve element 34*u*. The scale 190*u* is designed, in particular, to indicate a drill-hole depth. Since the sleeve element 34*u* is not subjected to any rotational motion during operation, the scale advantageously can always be easily read by the user. The scale 190*u* indicates the drill-hole depth, for example in 10 mm increments, but other scale increments are also conceivable. The scale 190*u* is produced, for example, by means of a printing process.

The sleeve element 34*u* is connected in a materially bonded and rotationally fixed manner to the suction extraction adapter 100*u*. The suction extraction adapter 100*u* is made, for example, from a plastic. The suction extraction adapter 100*u* has, for example, a single housing element 192*u*, which is connected in a materially bonded manner to the sleeve element 34*u* and can be separably connected to the suction hose 402 of the suction extraction device 400.

The suction extraction adapter 100*u* is additionally separably connected, via a junction interface 108*u*, to the main body 32*u* of the drilling tool 10*u*. Via the junction interface 108*u* the drilling tool 10*u* is connected in a force-fitting and form-fitting manner to the suction extraction adapter 100*u* in such a way that, when in operation, the drilling tool 10*u* rotates, or rotates and oscillates linearly, within the suction extraction adapter 100*u*. The junction interface 108*u* has, for example, two mutually corresponding securing elements 44*u*, 112*u*, by means of which the housing element 192 of the suction extraction adapter 100*u* is secured axially on the main body 32*u* of the drilling tool 10*u*.

The first securing element 44*u* is assigned to the drilling tool 10*u* and is realized as an annular groove arranged in the main body 32*u* of the drilling tool 10*u*. The first securing element 44*u* is arranged in front of the conveying channels 36*u* in the direction of advance of the drilling tool 10*u*. The second securing element 112*u* is assigned to the suction extraction adapter 100*u*. The second securing element 112*u* is realized, for example, as latch-in lug 194*u* (see FIG. 16). The suction extraction adapter 100*u* has, for example, two second securing elements 112*u*, which are arranged on mutually opposite sides.

For the purpose of assembling the suction extraction adapter 100*u* with the main body 32*u*, the suction extraction adapter 100*u* is pushed, with the sleeve element 34*u* foremost, onto the end of the drilling tool 10*u* that faces away from the drilling head 24*u*.

Assembling is effected substantially without force until the securing element 1121*u* impinges on the end of the drilling tool 10*u* that faces away from the drilling head 24*u*. The suction extraction adapter 100*u* has a mounting aid 196*u*, which is designed to facilitate assembling. The mounting aid 196*u* is realized as a slot 116*u*, such as that already described in connection with the first exemplary embodiment according to FIG. 2*d*. The slot 116*u* divides the housing element 192 into two housing portions 118*u*. The parting plane of the housing portions 118*u* is, for example, parallel to the longitudinal axis 12*u* of the drilling tool 10*u*, and intersects it. On its inner side each housing portion 118*u* has at least one second securing element 112*u*. The housing element 192*u* is made from a plastic of such elasticity that, upon the second securing elements 112*u* impinging upon the end of the drilling tool 10*u* that faces away from the drilling head 24*u*, the two housing portions 118*u* are spread apart from each other and the suction extraction adapter 100*u* can be slid fully onto the main body 32*u*. Advantageously, the second securing element 112*u* may be angled on the side that faces toward the sleeve element 34*u*, or the drilling head 24*u*, so as to further reduce the force required for assembling (see FIG. 16).

Figure 16:
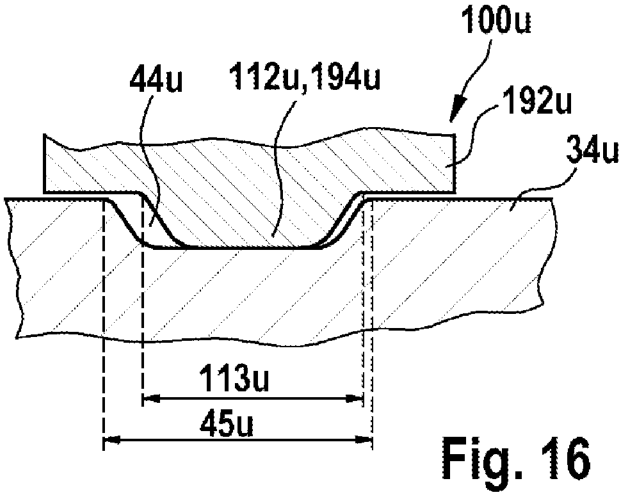
FIG. 16 a partial section through the drilling tool according to FIG. 15.

FIG. 16 shows a partial section through the suction extraction adapter 100*u* and the main body 32*u* in the connected state. A width 45*u* of the first securing element 44*u*, or of the groove, is greater than a width 113*u* of the second securing element 112*u*, or of the latch-in lug 194*u*. In particular, the width 45*u* of the groove 44*u* is at least 0.1 mm greater, preferably at least 1.0 mm greater, more preferably at least 10 mm greater, than the width 113*u* of the second securing element 112*u*. Preferably, the width 45*u* of the groove 44*u* is 0.5 mm to 2.0 mm wider than the width 113*u* of the latch-in lug 194*u*. As a result, advantageously, the percussive impulse generated by the drilling tool 10*u* during operation is transmitted in an non-direct and damped manner to the sleeve element 34*u* connected to the suction extraction adapter 100*u*, thereby prolonging the service life of the sleeve element 34*u*. A flank shape of the groove 45*u* and of the second securing element 112*u* may be different in this case.

The second securing element 112*u* is realized, for example, as a single piece with the housing element 192*u* of the suction extraction adapter 100*u*. It is also conceivable, however, for the second securing element 112*u* to be made from a softer and/or more elastic plastic than the housing element 192*u*. A suction extraction adapter 100*u* having such a second securing element 112*u* may be produced, for example, by means of a multi-component injection molding process or by use of the second securing element 112*u* as an insert in the injection molding process. The second securing element 112*u* is preferably made from polyamide or polypropylene, preferably acrylonitrile butadiene rubber.

Figure 17A:
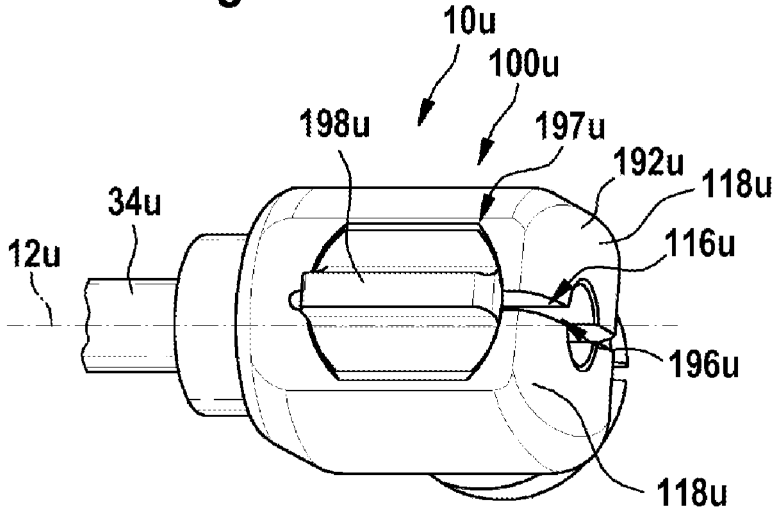
FIG. 17*a* a perspective partial view of the drilling tool according to FIG. 15.

Furthermore, the suction extraction adapter 100*u* has a demounting aid 197*u*, which is designed to facilitate demounting of the suction extraction adapter 100*u* (see FIG. 17*a*. The demounting aid 197*u* comprises an operating element 198*u*, which is arranged at least partially on the outside of the suction extraction adapter 100*u*. The operating element is realized, for example, as an operating lever, which is rotatably mounted in the suction extraction adapter 100*u*, in particular in the housing element 192*u*. A rotation axis of the operating element 198*u* extends substantially perpendicularly in relation to the longitudinal axis 12*u* of the drilling tool and in particular intersects it. The operating element 198*u* has a spreading element 199*u* (see FIG. 17*b*). The operating element 198*u* and the spreading element 199*u* are realized, for example, as a single piece. The spreading element 199*u* is rotatably accommodated in an substantially oval bore. The suction extraction adapter 100*u* has, in particular, two spreading element 199*u*, which are arranged on mutually opposite sides.

Figure 17B:
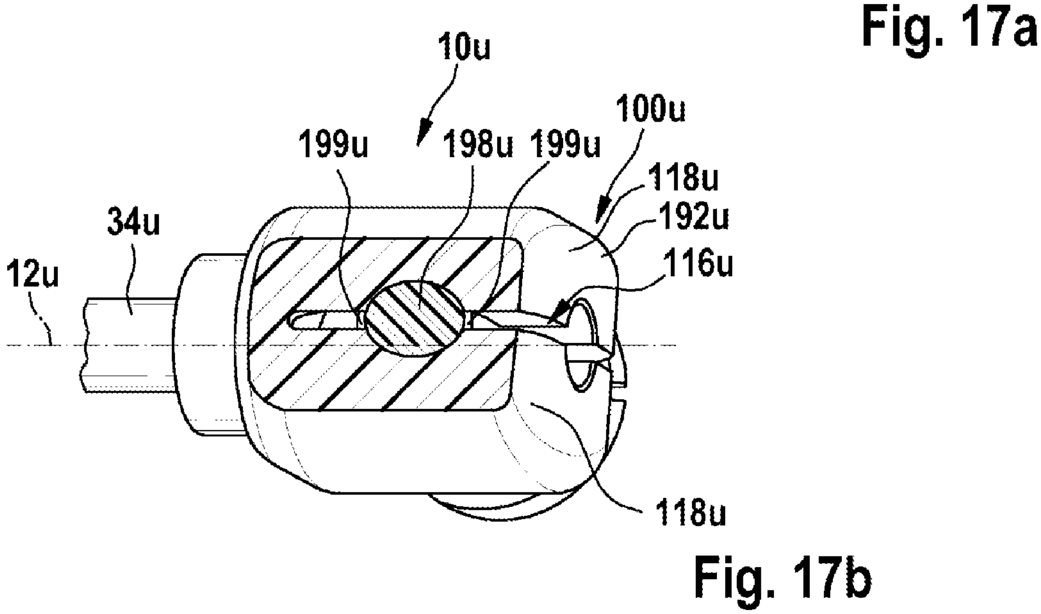
FIG. 17*b* a perspective partial section through the drilling tool according to FIG. 15.

The operating element 198*u* is designed to be movable between a first position, in which demounting of the suction extraction adapter 100*u* is not facilitated or only minimally facilitated, and a second position, in which demounting of the suction extraction adapter 100*u* is maximally facilitated. In particular, in the first position the housing portions 118*u* are spread least, and in the second position they are spread maximally. For example, the operating element 198*u* is realized in such a manner that a rotation of the operating element 198*u* by 90° causes the operating element 198*u* to be moved from the first to the second position. FIG. 17*b* shows the operating element 198*u* in the first position. In the second position the spreading elements 199*u* are arranged, at least partially, in the region of the slot 116*u*. In particular, a straight line that centrally intersects the spreading elements 116*u* extends substantially parallel to the longitudinal axis 12*u* of the drilling tool 10*u*. In the second position of the operating element 198*u*, the two spreading elements 199*u* impinge upon the suction extraction adapter 100*u*, in particular the two housing portions 118*u*, in such a manner that they are spread apart from each other. The securing elements 44*u*, 112*u* are thereby brought at least partially out of engagement, as a result of which the force required to release the suction extraction adapter 100*u* from the main body 32*u* is significantly reduce. The spreading elements 199*u* are realized, for example, as substantially oval domes.

Figure 18A:
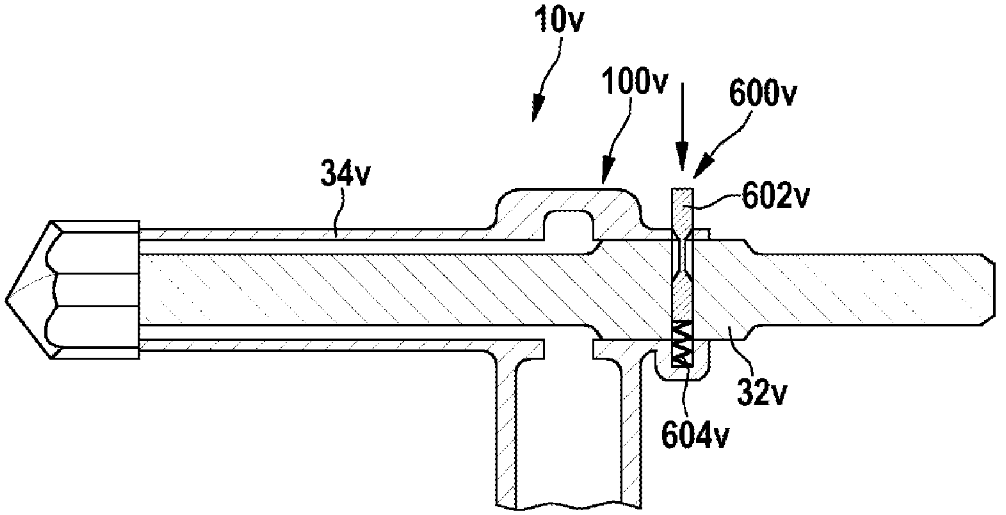
FIG. 18*a* a longitudinal section through an alternative embodiment of the drilling tool.

FIG. 18*a* shows a further embodiment of the drilling tool 10 according to FIG. 2*a*. The drilling tool 10*v* has a main body 32*v*, a sleeve element 34*v* and a suction extraction adapter 100*v*. She sleeve element 34*v* is made from plastic, as a single piece with the suction extraction adapter 100*v*.

The suction extraction adapter 100*v* is connected to the main body 32*v* via a manually actuated fixing device 600*v*. The fixing device 600*v* comprises a push-button switch 602*v* that is movably mounted in the suction extraction adapter 100*v*. A force is applied to the push-button switch 602*v* via a spring element 604*v*. The spring element 604*v* is realized, for example, as a coil spring. The push-button switch 602*v* is advantageously realized in such a manner that it latches automatically into an annular groove 44*u* of the main body 32*v* upon the suction extraction adapter 100*v* being connected to the main body 32*v*. In the connected state, the suction extraction adapter 100*v* is connected in a form-fitting manner to the main body 32*v* via the push-button switch 602*v* in such a way that an axial movement is limited in two opposite directions.

Figure 18B:
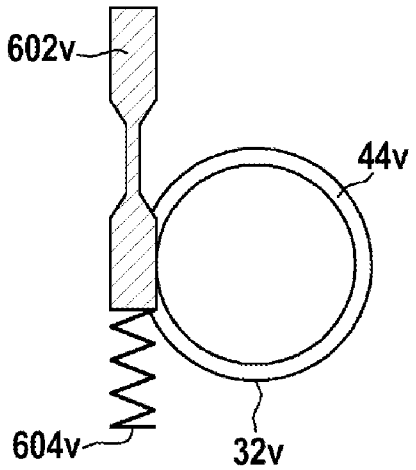
FIG. 18*b* a cross section through the drilling tool according to FIG. 18*a* in the locked state.
Figure 18C:
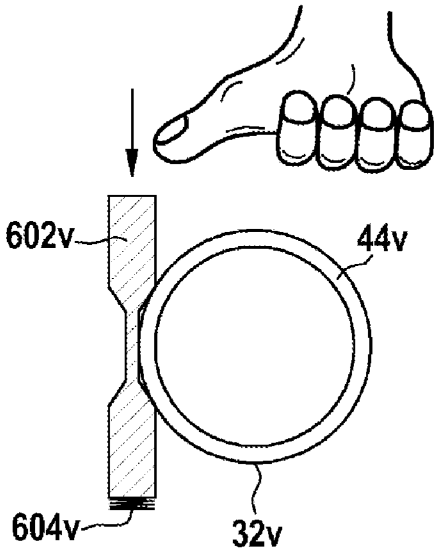
FIG. 18*c* a cross section through the drilling tool according to FIG. 18*a* in the unlocked state.

The push-button switch 602*v* is shaped in such a manner that it can be brought out of engagement with the groove 44*v*, contrary to the spring force of the spring element 604*v*, by a manual actuation, as a result of which the form-fitting connection is undone and the suction extraction adapter 100*v* can be demounted (cf. FIG. 18*b* and FIG. 18*c*).

Figure 19:
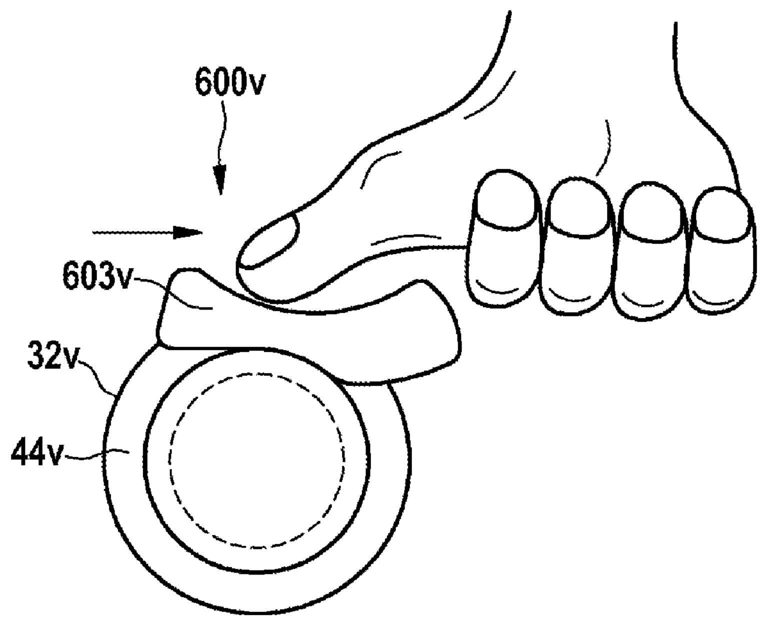
FIG. 19 a cross section through an alternative embodiment of the drilling tool according to FIG. 18*a;*

Alternatively, it would also be conceivable for the push-button switch 602*v* to be realized as a slide switch 603*v*, as shown, as an example, in the section according to FIG. 19.

Figure 20:
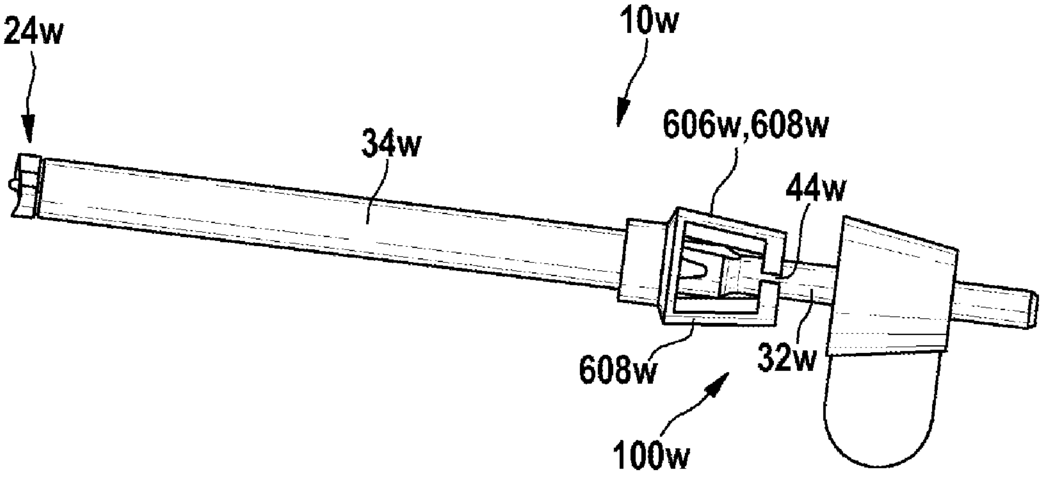
FIG. 20 a perspective view of a further alternative embodiment of the drilling tool.

FIG. 20 shows a further alternative embodiment of the drilling tool 10 according to FIG. 2*a*. The drilling tool low has a main body 32*w*, having an annular groove 44*w*, by means of which the main body 32*w* can be connected to the suction extraction adapter 100*w*. The suction extraction adapter 100*w* is realized as two parts, the first part being realized as a single part, in particular a single piece, with the sleeve element 34*w*. To aid illustration, the two parts of the suction extraction adapter 100*w* are shown in the non-connected state. At its end that faces away from the drilling head 24*w*, the sleeve element 34*w* has at least one form-fit element 606*w*, which is separably connectable to the main body 32*w*. For example, the sleeve element 34*w* has two form-fit elements 606*w*, realized as latching arms 608*w*. The sleeve element 34*w* is made from a plastic, in particular an elastic plastic, such that the connection of the sleeve element 34*w* to the main body 32*w* can be undone by spreading the latching arms 608*w*. The sleeve element 34*w* can be secured axially on the main body 32*w* by means of the latching arms 608*w*. By means of a force-fitting connection, for example, the sleeve element 34*w* is connected to the second part of the suction extraction adapter 100*w*, which has a junction for a suction extraction device. Alternatively or addition, a form-fitting connection would also be conceivable. The second part of the sleeve element 34*w* is pushed onto the latching arms 608*w*, such that it forms a force-fitting connection with the outer face of the latching arms and, advantageously, additionally secures the latching arms 608_w_ in the groove 44_w_.

Figure 21A:
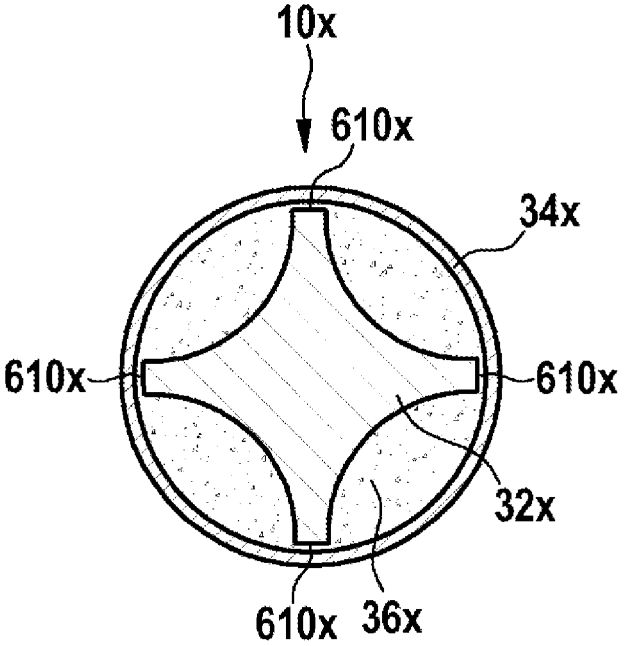
FIG. 21*a* a cross section through an alternative embodiment of the drilling tool in the region of the drilling head.
Figure 21B:
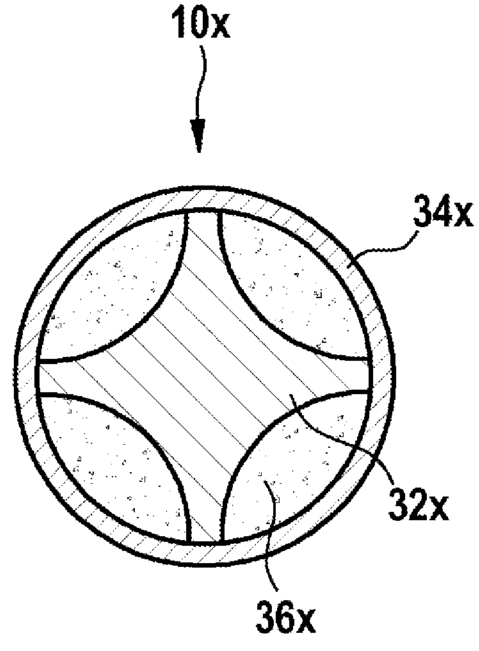
FIG. 21*b* a cross section through the drilling tool according to FIG. 21*a* in the region of the suction extraction adapter.

FIGS. 21_a_ and _b_ each show a cross section through an alternative drilling tool lox, which corresponds substantially to the drilling tool 10 according to FIG. 2. The cross section according to FIG. 21_a_ is located in the region of the drilling head, and the cross section according to FIG. 21_b_ is located in the region of the suction extraction adapter.

The drilling tool 10_x_ differs, in particular, in the sleeve element 34_x_, which has a conical shape. In particular, at its end that faces toward the drilling head the sleeve element 34_x_ has a maximum inner diameter, and at its end that faces away from the drilling head it has a minimum inner diameter. Owing to the size of the inner diameter of the sleeve element 34_x_, a gap 610_x_ is formed radially between the main body 32_x_ and the sleeve element 34_x_. Due to the gap, both a flow of fluid and dust particles and/or drilling cuttings can be moved, or exchanged, between the conveying channels 36_x_. For example, the size of the gap 610_x_ is substantially 1 mm, and other gap sizes would also be conceivable, depending on the planned application and size of the drilling tool.

The reduction of the inner diameter of the sleeve element 34_x_ is realized, for example, in that the wall thickness 612_x_ of the sleeve element 34_x_ decreases toward the drilling head. In the region of the minimum inner diameter of the sleeve element 34_x_, the inner diameter corresponds substantially to the outer diameter of the main body 32_x_. In this region, the drilling tool 10_x_ has no gap 610_x_.

What is claimed is:

1. A drilling tool comprising:

a housing portion;

a drilling head positioned forwardly of the housing portion;

an insertion end positioned rearwardly of the housing portion and operably connected to the drilling head through a main body, the insertion end configured to couple the drilling tool with a power tool;

a sleeve element defining a longitudinal axis and having a rearward first end portion coupled to the housing portion, and a forward second end portion spaced apart from the first end portion;

at least one conveying channel that extends along the main body and is defined by the main body and the sleeve element, the at least one conveying channel having a first cross-sectional area in a first plane orthogonal to the longitudinal axis; and at least one opening into the at least one conveying channel defined at least in part by the drilling head, the at least one opening smaller than the first cross-sectional area, wherein the at least one conveying channel comprises a first and a second conveying channel, and the at least one opening is defined by a forward facing portion of the forward second end portion of the sleeve element and a rearward facing portion of the drilling head.

2. The drilling tool as claimed in claim 1, wherein the at least one conveying channel is defined by at least one groove in the main body and/or in the sleeve element.

3. The drilling tool as claimed in claim 1, wherein:

the sleeve element is connected in a rotationally fixed manner to the housing portion; and the housing portion is in the form of a suction extraction adapter, which is configured to connect the drilling tool to a suction extraction device.

4. The drilling tool as claimed in claim 3, wherein the sleeve element is connected in a form-fitting and/or force-fitting manner to the suction extraction adapter.

5. The drilling tool as claimed in claim 3, wherein the sleeve element is connected to the suction extraction adapter in a materially bonded manner.

6. The drilling tool as claimed in claim 1, wherein:

a securing element is realized as a securing ring arranged rearwardly of the sleeve element; and the securing element is configured to restrict relative movement of the main body with respect to the sleeve element in two axial directions along the longitudinal axis.

7. The drilling tool as claimed in claim 1, wherein;

a securing element is connected to the main body in a force-fitting and/or form-fitting manner; and the securing element is configured to restrict relative movement of the main body with respect to the sleeve element in two axial directions along the longitudinal axis.

8. The drilling tool as claimed in claim 1, wherein:

the housing portion is in the form of a suction extraction adapter;

a securing element is realized so as to form a single part with the suction extraction adapter; and the securing element is configured to restrict relative movement of the main body with respect to the sleeve element in two axial directions along the longitudinal axis.

9. The drilling tool as claimed in claim 8, wherein the suction extraction adapter is deformable for making and/or undoing a connection to the main body.

10. The drilling tool as claimed in claim 1, wherein:

each of the first conveying channel and a second conveying channel have a respective first cross-sectional area in the first plane;

a gap is defined between the sleeve element and the main body, the gap configured such that dust particles or drilling cuttings are exchanged between the first conveying channel and the second conveying channel when the drilling tool is in operation; and the gap has a second cross-sectional area in the first plane, the second cross-section area smaller than the respective first cross-sectional areas.

11. The drilling tool as claimed in claim 10, wherein the gap has a size of at least 0.05 mm between the main body and the sleeve element.

12. The drilling tool as claimed in claim 11, wherein the size of the gap is at least 0.1 mm between the main body and the sleeve element.

13. The drilling tool as claimed in claim 12, wherein the size of the gap is at least 0.25 mm between the main body and the sleeve element.

14. The drilling tool as claimed in as claimed in claim 10, wherein the gap extends along at least 10% of a length of the sleeve element.

15. The drilling tool as claimed in claim 14 wherein the gap extends along at least 25% of the length of the sleeve element.

16. The drilling tool as claimed in claim 15 wherein the gap extends along at least 50% of the length of the sleeve element.

17. The drilling tool as claimed in claim 1, wherein the drilling tool is a rock drill bit.

18. The drilling tool as claimed in claim 1, wherein the drilling tool is configured to couple with the power tool solely through the insertion end.

19. The drilling tool as claimed in claim 1, wherein:
the main body includes an annular groove;
a securing element is realized as at least one cylindrical pin positioned at least partially within the annular groove; and
the securing element is configured to restrict relative movement of the main body with respect to the sleeve element in two axial directions along the longitudinal axis.

20. A drilling tool comprising:
a drilling head;
an insertion end configured to couple with a power tool;
a main body;
a suction extraction adapter which is configured to connect the drilling tool to a suction extraction device;
a sleeve element mounted to the suction extraction adapter;
a conveying region arranged between the drilling head and the insertion end; and
at least one conveying channel that extends along the conveying region,
wherein the drilling tool extends along a longitudinal axis,
wherein the at least one conveying channel is arranged radially between the sleeve element and the main body,
wherein the sleeve element is configured to be rotatably mounted on the main body independent of a coupling of the insertion end with the power tool,
wherein the main body includes an annular groove,
wherein the sleeve element is mounted axially on the main body such that axial movement in one axial direction is restricted via a securing element,
wherein the securing element is realized as at least one cylindrical pin positioned at least partially within the annular groove,
wherein the at least one conveying channel comprises a first and a second conveying channel,
wherein at least one opening into the at least one conveying channel is defined at least in part by the drilling head, and
wherein the at least one opening is defined by a forward facing portion of the sleeve element and a rearward facing portion of the drilling head.

21. A drilling tool comprising:
a drilling head;
an insertion end configured to couple with a power tool;
a main body;
a sleeve element;
a conveying region arranged between the drilling head and the insertion end;
a securing element; and
a first and a second conveying channel each of which extends along the conveying region,
wherein the drilling tool extends along a longitudinal axis,
wherein the securing element extends in a plane transverse to the longitudinal axis and includes a first portion in the plane proximate the longitudinal axis configured to engage the main body and a second portion in the plane distal to the longitudinal axis configured to engage the sleeve element or formed integrally with the sleeve element such that the sleeve element is rotatably mounted on the main body and such that relative movement along the longitudinal axis between the main body and the sleeve element is restricted in two axial directions along the longitudinal axis,
wherein the first and second conveying channels are arranged radially between the sleeve element and the main body,
wherein the first and second conveying channels are defined by respective first and second grooves in the main body and/or in the sleeve element,
wherein in an assembled state, a gap is defined between the sleeve element and the main body, the gap realized in such a manner that dust particles or drilling cuttings are exchanged between first and second conveying channels,
wherein the main body includes an annular groove,
wherein the sleeve element is mounted axially on the main body such that axial movement in one axial direction is restricted via a securing element, and
wherein the securing element is realized as at least one cylindrical pin positioned at least partially within the annular groove,
wherein at least one opening into the at least one conveying channel is defined at least in part by the drilling head, and
wherein the at least one opening is defined by a forward facing portion of the sleeve element and a rearward facing portion of the drilling head.

* * * * *